(12) United States Patent
Matsukawa

(10) Patent No.: US 9,213,615 B2
(45) Date of Patent: *Dec. 15, 2015

(54) INFORMATION PROCESSING APPARATUS WITH DEBUGGING UNIT AND DEBUGGING METHOD THEREFOR

(71) Applicant: Renesas Electronics Corporation, Kanagawa (JP)

(72) Inventor: Kazuya Matsukawa, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/625,814

(22) Filed: Feb. 19, 2015

(65) Prior Publication Data

US 2015/0161019 A1 Jun. 11, 2015

Related U.S. Application Data

(63) Continuation of application No. 13/030,941, filed on Feb. 18, 2011, now Pat. No. 8,996,918.

(30) Foreign Application Priority Data

Feb. 19, 2010 (JP) ................................ 2010-034338

(51) Int. Cl.
*G06F 11/00* (2006.01)
*G06F 11/26* (2006.01)
(Continued)

(52) U.S. Cl.
CPC ............ *G06F 11/26* (2013.01); *G06F 11/2236* (2013.01); *G06F 11/2733* (2013.01); *G06F 11/28* (2013.01); *G06F 11/36* (2013.01); *G06F 13/38* (2013.01); *G06F 13/42* (2013.01)

(58) Field of Classification Search
USPC ...................................................... 714/30, 25
See application file for complete search history.

(56) References Cited

U.S. PATENT DOCUMENTS 6,591,369 B1 7/2003 Edwards et al.
7,734,967 B2 * 6/2010 Chung et al. .................. 714/719
(Continued)

FOREIGN PATENT DOCUMENTS

| JP | 2006-252006 A | 9/2006 |
| JP | 4145146 B2 | 9/2008 |
| WO | 2008-056739 A1 | 5/2008 |

OTHER PUBLICATIONS

Japanese Office Action issued Oct. 30, 2013 in corresponding Japanese Patent Application No. 2010-034338.
(Continued)

*Primary Examiner* — Kamini Patel
(74) *Attorney, Agent, or Firm* — Sughrue Mion, PLLC

(57) ABSTRACT

An information processing apparatus includes an external tool unit configured to provide a man-machine interface to a debugging user; and a microcontroller. The microcontroller includes: a CPU section configured to execute a program as a debugging target in a response to a first clock signal, wherein a clock rate of the first clock signal is changed in response to an instruction from the CPU section; a first transmitting section configured to transmit debugging data to the external tool unit in response to the first clock signal; a second transmitting section configured to transmit the debugging data to the external tool unit in response to a second clock signal which is different from the first clock signal; and a receiving section configured to receive data transmitted from the external tool unit.

4 Claims, 23 Drawing Sheets

(51) Int. Cl.
*G06F 13/38* (2006.01)
*G06F 13/42* (2006.01)
*G06F 11/28* (2006.01)
*G06F 11/22* (2006.01)
*G06F 11/36* (2006.01)
*G06F 11/273* (2006.01)

(56) References Cited

U.S. PATENT DOCUMENTS 8,473,724 B1 * 6/2013 Kenville et al. ............... 712/229
2002/0116081 A1 8/2002 Wood et al.
2004/0039963 A1 * 2/2004 Burch ............................ 714/25
2004/0221201 A1 11/2004 Seroff
2006/0206763 A1 * 9/2006 Kudo ............................ 714/30
2010/0040123 A1 2/2010 Iwata et al.

OTHER PUBLICATIONS

Communication dated Nov. 17, 2014, issued by the State Intellectual Property Office of P.R. China in counterpart Chinese application No. 201110043117.4.

* cited by examiner

Fig. 6

| CMD | TRANSMISSION CLOCK RATE | RECEPTION CLOCK RATE |
|---|---|---|
| 00H | DEBUG CLOCK RATE | DEBUG CLOCK RATE |
| 01H | (NON-APPLICATION) | (NON-APPLICATION) |
| 02H | DEBUG CLOCK RATE | (NON-APPLICATION) |
| 03H | DEBUG CLOCK RATE | HIGH-SPEED SYSTEM CLOCK RATE (INITIAL VALUE) |
|  |  | LOW-SPEED SYSTEM CLOCK RATE |
|  |  | SYSTEM CLOCK STOPPED |

Fig. 7

| CMD | COMMAND | BIT ALLOCATION OF COMMAND SUBFIELDS | | | | | | | |
|---|---|---|---|---|---|---|---|---|---|
| | | 0 | 1 | 2 | 3 | 4 | 5 | 6 | 7 |
| 00H | CLOCK RATE DISPLAY REGISTER READ | HIGH-SPEED | LOW-SPEED | STOP | (RESERVED) | (NOT USED) | | | REQUEST |
| 01H | (RESERVED) | | | | | | | | |
| 02H | RAM ADDRESS SETTING REGISTER WRITE | RAM ADDRESS | | | | | | | |
| 03H | RAM MONITOR READ | RAM MONITOR DATA | | | | | | | |

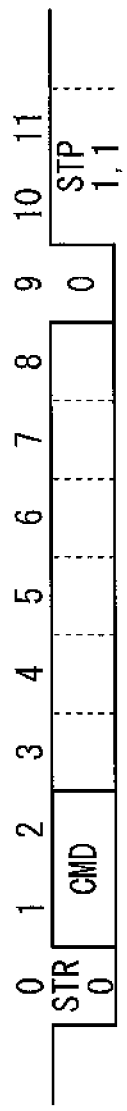
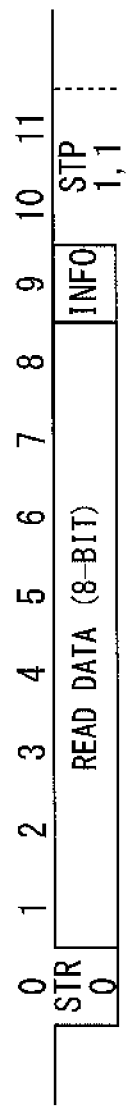
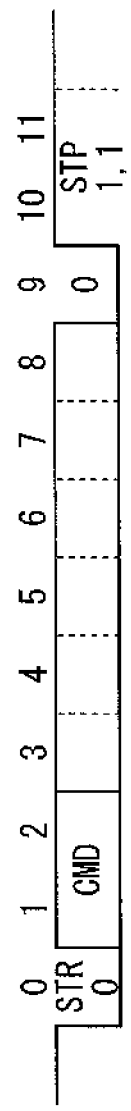
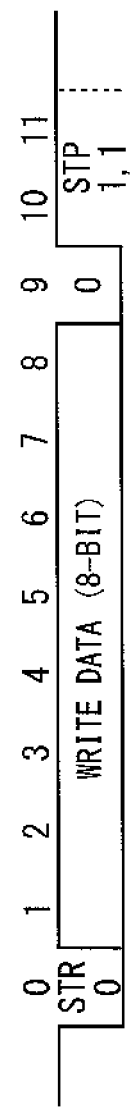
Fig. 8A  READ COMMAND TRANSFER 501→101
Fig. 8B  READ DATA TRANSFER 501←101
Fig. 8C  WRITE COMMAND TRANSFER 501→101
Fig. 8D  WRITE DATA TRANSFER 501←101

Fig. 16

| CMD | COMMAND | BIT ALLOCATION OF COMMAND SUBFIELDS | | | | | | | |
|---|---|---|---|---|---|---|---|---|---|
| | | 0 | 1 | 2 | 3 | 4 | 5 | 6 | 7 |
| 00H | CLOCK RATE DISPLAY REGISTER READ | HIGH-SPEED | LOW-SPEED | STOP | (NOT USED) | | | | REQUEST |
| 01H | CLOCK RATE CHANGE PERMISSION | | | | | | | | |
| 02H | (RESERVED) | (RESERVED) | | | | | | | |
| 03H | (RESERVED) | (RESERVED) | | | | | | | |
| 04H | DATA TRACE START | (NOT USED) | | | | | | | |
| 05H | DATA TRACE END | (NOT USED) | | | | | | | |
| 06H | TRACE DATA ACQUISITION (READ) | FORMAT I (LOWER 8-BIT) / II TRACE DATA | | | | | | | |
| | | FORMAT I (UPPER 8-BIT) TRACE DATA | | | | | | | |
| 07H | (RESERVED) | (RESERVED) | | | | | | | |

Fig. 17

| CMD | TRANSMISSION CLOCK RATE | RECEPTION CLOCK RATE |
|---|---|---|
| 00H | DEBUG CLOCK RATE (FIXED) | DEBUG CLOCK RATE (FIXED) |
| 01H | DEBUG CLOCK RATE (FIXED) | (NON-APPLICATION) |
| 02H | (NON-APPLICATION) | (NON-APPLICATION) |
| 03H | (NON-APPLICATION) | (NON-APPLICATION) |
| 04H | DEBUG CLOCK RATE (FIXED) | (NON-APPLICATION) |
| 05H | DEBUG CLOCK RATE (FIXED) | (NON-APPLICATION) |
| 06H | DEBUG CLOCK RATE (FIXED) | HIGH-SPEED SYSTEM CLOCK RATE / LOW-SPEED SYSTEM CLOCK RATE / SYSTEM CLOCK STOPPED (INITIAL VALUE) |
| 07H | (NON-APPLICATION) | (NON-APPLICATION) |

READ COMMAND TRANSFER
502→102

READ DATA TRANSFER
502←102

TRACE TRANSFER L
502←102

TRACE TRANSFER M
502←102

CONTROL COMMAND TRANSFER
502→102

Fig. 19A FORMAT A

| TCODE | AC_ADDR | AC_DATA |
|---|---|---|
| 0 1 | 2 3 4 5 6 7 | 8 9 10 11 12 13 14 15 |

Fig. 19B FORMAT B

| TCODE | (UNUSED) |
|---|---|
| 0 1 | 2 3 4 5 6 7 |

Fig. 19C TCODE

| TCODE | CONTENT |
|---|---|
| 00H | |
| 01H | CPU WRITE |
| 02H | INFO ACTIVE |
| 03H | |

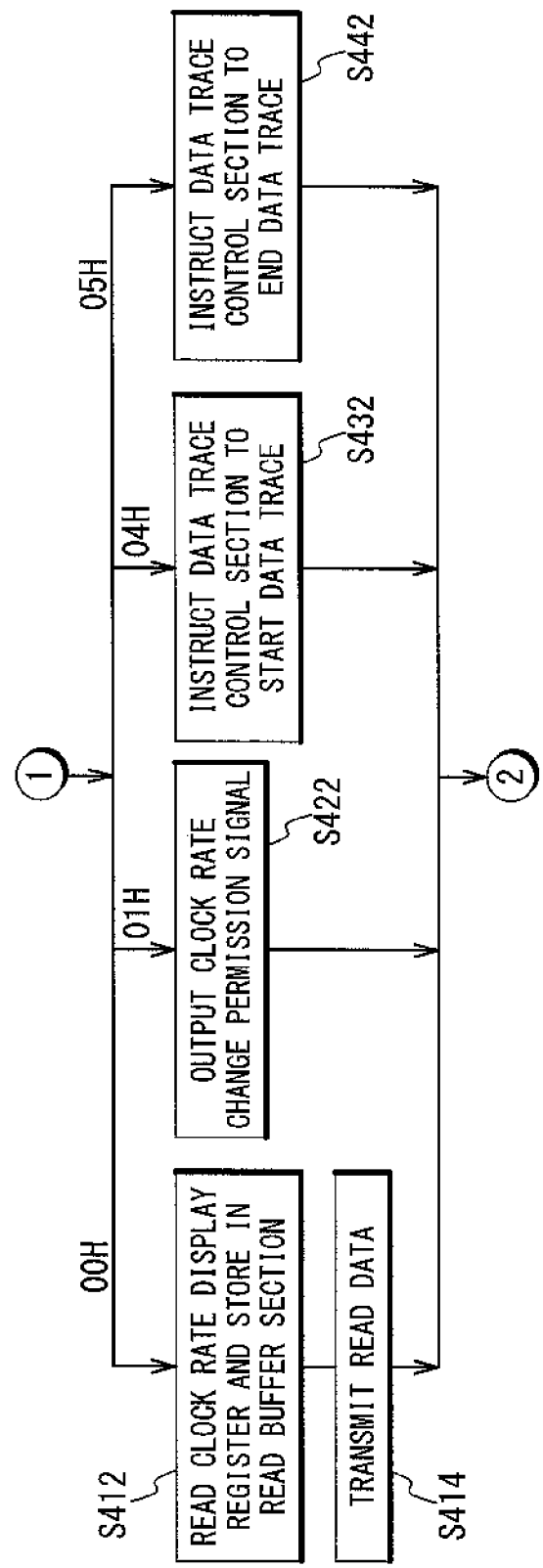

INFORMATION PROCESSING APPARATUS WITH DEBUGGING UNIT AND DEBUGGING METHOD THEREFOR

INCORPORATION BY REFERENCE

This application is a Continuation of U.S. application Ser. No. 13/030,941, filed Feb. 18, 2011, which is based upon and claims the benefit of priority from Japanese Patent Application No. 2010-34338 filed on Feb. 19, 2010, the contents of all of which are incorporated herein by reference in their entirety.

BACKGROUND

The present invention relates to an information processing apparatus, a debugging unit and a debugging method of the information processing apparatus.

In an example described in Patent Literature 1 (JP 2006-252006A), a 1-pin external terminal is used for interface between an external tool (host device) and a debugging unit with a microcontroller (MCU) built therein by use of asynchronous communication unit (UART: universal asynchronous receiver-transmitter). A transmission/reception instruction is issued from a CPU (central processing unit) to the asynchronous communication unit, and an operation clock signal of the asynchronous communication unit is supplied from a clock oscillator. This clock signal is also supplied to the CPU.

Accordingly, when the microcontroller changes to a low power consumption mode to stop the clock signal, the asynchronous communication unit is also stopped to disable communication with the external tool, resulting in that a debugging operation is interrupted.

Patent Literature 2 (Japanese patent No. 4145146) discloses a technique of using a background debug system for interface between an external tool (host unit) and a debugging unit with a microcontroller (MCU) built therein. In the debugging unit with the microcontroller, a 1-pin external terminal is used to interface with the external tool. The background debug system can operate independently from a CPU. An operation clock is supplied by a dedicated background debug clock signal from a clock unit. When activation of the background debug system is notified to the clock unit by an EN_BDM signal, the supply of the background debug clock signal is not stopped even if supply of clock signal to the CPU or the like is stopped. The technique disclosed in Patent Literature 2 is largely different from the technique disclosed in Patent Literature 1 in this point.

Patent Literature 2 further discloses a method of synchronizing a communication rate between the background debug system to which a frequency-divided clock signal is supplied from a clock control section having a function of frequency-dividing a clock signal, and the external tool. A communication rate synchronizing procedure is as follows. First, the external tool outputs a synchronizing request. When detecting the synchronizing request, the background debug system outputs an "L" pulse having a width of a predetermined number of clocks (128 cycles) in response to the request. The external tool can recognize a clock rate of the background debug clock signal used by the background debug system by measuring the width (time) of the "L" pulse. The external tool performs communication at the same clock rate as the clock rate of the background debug clock. In this manner, the communication rate can be synchronized.

As described above, when the background debug system is activated, the background debug clock is not stopped even if the microcontroller (MCU) stops its clock signal and shifts to the low power consumption mode. Thus, the microcontroller can communicate with the external tool at all times, thereby continuing the debug operation. However, according to a general method of shifting the microcontroller to the low power consumption mode, a frequency dividing ratio of the clock control section is often changed according to a user application program to be debugged. Accordingly, when the microcontroller (MCU) shifts to the low-speed clock mode, that is, when low power consumption mode and the clock control section and the oscillator are provided in common, a switching point of the clock rate of the background debug clock signal is generally unrelated to a state of communication between the background debug system and the external tool, and the communication rate may asynchronously change, which conducts to improper communication. In other words, the debug operation cannot be normally continued.

Patent Literature 2 discloses the method of synchronizing the communication rate between the background debug system and the external tool. However, according to the communication rate synchronizing method, since the synchronizing procedure is started in response to the synchronizing request from the external tool, the external tool cannot change the communication rate at a proper timing even when the frequency dividing ratio of the clock control section is changed during the debug operation, in particular, during communication. Therefore, since the external tool has no means and methods for detecting timing of changing the clock rate of the background debug clock signal, it is impossible to avoid the above-mentioned improper communication.

CITATION LIST

[Patent Literature 1]: JP 2006-252006A
[Patent Literature 2]: Japanese Patent No. 4145146

SUMMARY

The present invention provides a debugging unit, a communication method and an information processing apparatus, that can transmit/receive data at a communication rate suitable for communication contents without causing a communication error so that performance of a debugging function can be optimally maintained.

In an aspect of the present invention, an information processing apparatus includes: an external tool unit configured to provide a man-machine interface to a debugging user; and a microcontroller. The microcontroller includes: a CPU section configured to execute a program as a debugging target in a response to a first clock signal, wherein a clock rate of the first clock signal is changed in response to an instruction from the CPU section; a first transmitting section configured to transmit debugging data to the external tool unit in response to the first clock signal; a second transmitting section configured to transmit the debugging data to the external tool unit in response to a second clock signal which is different from the first clock signal; and a receiving section configured to receive data transmitted from the external tool unit.

In another aspect of the present invention, a microcontroller includes: a CPU section configured to execute a program as a debugging object in response to a first clock signal, wherein a clock rate of the first clock signal is changed based on an instruction from the CPU section; a first transmitting section configured to transmit debugging data to an external tool unit having a man-machine interface to the debugging user in response to the first clock signal; a second transmitting section configured to transmit the debugging data to the external tool unit in response to a second clock signal which is different from the first clock signal; and a receiving section configured to receive data transmitted from the external tool unit.

In still another aspect of the present invention, a debugging apparatus includes: a first transmitting section configured to transmit debugging data to an external tool unit in response to a first clock signal, wherein a clock rate of the first clock signal is changed based on a command from a CPU section, and the CPU section executes a program as a debugging target; a second transmitting section configured to transmit the debugging data to the external tool unit in response to a second clock signal which is different from the first clock signal; and a receiving section configured to receive data transmitted from the external tool unit.

In still another aspect of the present invention an external tool unit includes: a receiving section configured to receive debugging data transmitted from a first transmitting section of a microcontroller which executes a program as a debugging target in response to a first clock signal, a clock rate of which is changed based on a command from a CPU section, and the debugging data transmitted from a second transmitting section of the microcontroller based on a second clock signal which is different from the first clock signal; and a tool transmitting section configured to transmit a command to the receiving section of the microcontroller.

It is another aspect of the present invention to provide a debugging method by using a microcontroller which executes a program as a debugging target in response to a first clock signal, and an external tool unit which provides a man-machine interface to a debugging user. The debugging method is achieved by transmitting debugging data to the external tool unit from a first transmitting section in the microcontroller in response to the first clock signal; by transmitting debugging data to the external tool unit from a second transmitting section in the microcontroller in response to a second clock signal which is different from the first clock signal; by receiving data transmitted from the external tool unit by a receiving section in the microcontroller; and by changing a clock rate of the first clock signal based on a command from the microcontroller.

According to the present invention, the information processing apparatus, a debugging unit and a debugging method of the information processing apparatus can be provided, in which a debugging communication rate can be optimally maintained without causing any communication error with an external tool, even if a system clock rate is changed according to a user program independently from a debug operation.

BRIEF DESCRIPTION OF THE DRAWINGS

The above and other objects, advantages and features of the present invention will be more apparent from the following description of certain embodiments taken in conjunction with the accompanying drawings, in which:

FIG. 6 is a diagram showing a configuration of a communication rate management table 521;

FIG. 7 is a diagram showing commands described in the first embodiment;

FIGS. 8A to 8D are diagrams showing transfer formats in communication between the microcontroller 101 and the external tool 501;

FIG. 16 is a diagram showing commands in the second embodiment;

FIG. 17 is a block diagram showing a configuration of a communication rate management table 522;

FIGS. 19A to 19C are diagrams showing formats of transmitted/received data;

FIGS. 22A and 22B are a flowchart showing an operation of the transmitting and receiving section 302.

DETAILED DESCRIPTION

Hereinafter, an information processing apparatus according to the present invention will be described with reference to the attached drawings.

First Embodiment

Figure 1:
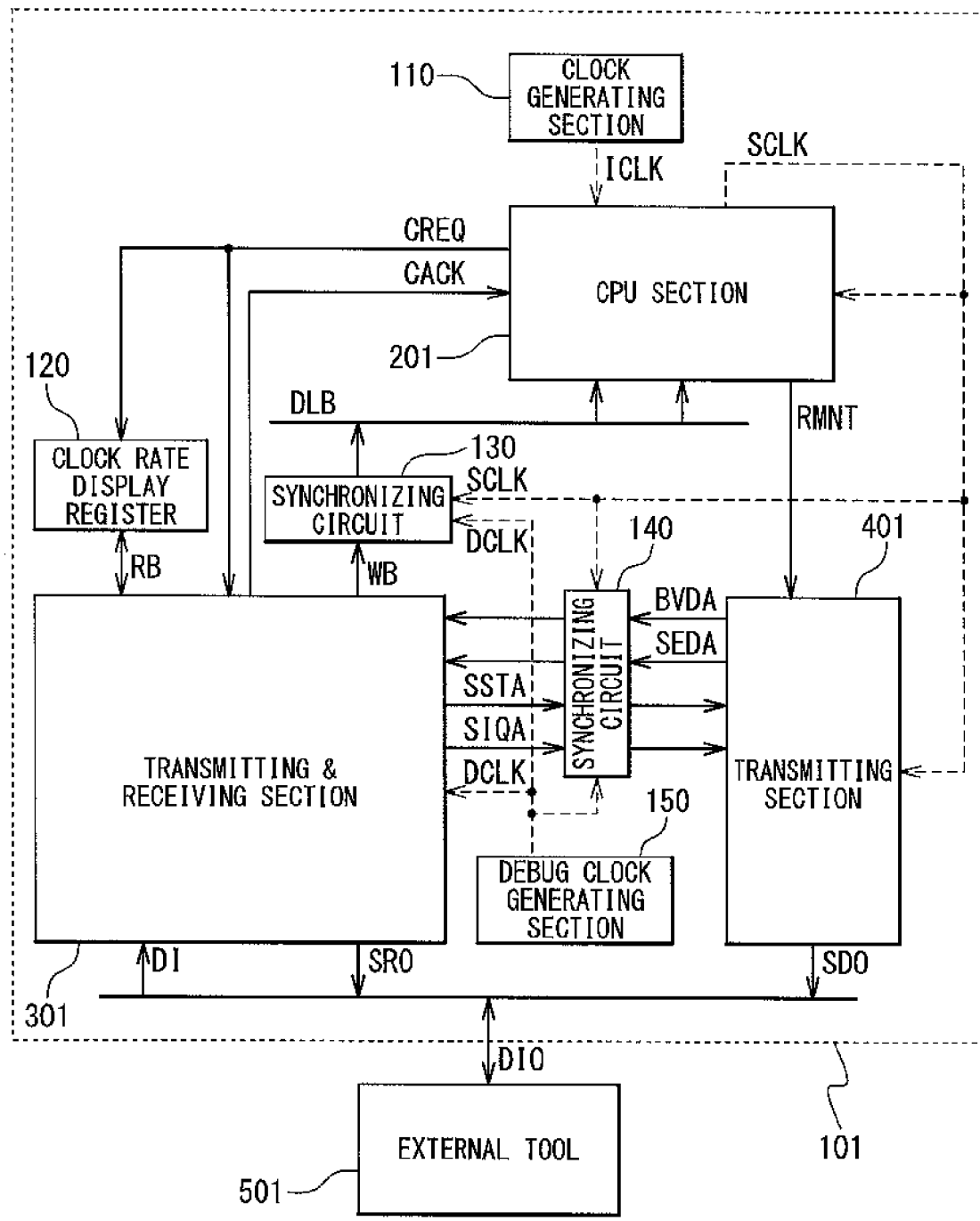
FIG. 1 is a block diagram showing a configuration of an information processing apparatus according to a first embodiment of the present invention.

FIG. 1 is a block diagram showing a configuration related to a debugging operation in an information processing apparatus according to the present invention. The information processing apparatus includes a microcontroller (MCU) 101 and an external tool 501. Here, the external tool 501 may be provided in the information processing apparatus or separately from the information processing apparatus. The external tool provides a man-machine interface to a user. The microcontroller 101 is provided with a transmitting and receiving section 301, a transmitting section 401, a CPU section 201, a debug clock generating section 150, synchronizing circuits 130 and 140, a clock rate display register 120 and a clock generating section 110. The sections other than the CPU section 201 constitute a so-called debugging unit and the CPU section 201 has a function of supporting the debugging operation. Among these sections, the transmitting and receiving section 301, the transmitting section 401 and the clock rate display register 120 are features of the present invention. The present invention is also featured by supplying a debug clock signal DCLK outputted from the debug clock generating section 150 to the transmitting and receiving section 301 and supplying a system clock signal SCLK generated by the CPU section 201 to the transmitting section 401.

The present embodiment shows an example of realizing a RAM monitor function as one of debug functions. The synchronizing circuits 130 and 140 are circuits for synchronizing signals inputted/outputted between sections in which reference operation clock signals are different. Because meaning of the signal is unchanged before and after synchronization, a signal after synchronization is represented by adding "(SYN)" to a sign representing the signal before synchronization.

Figure 2:
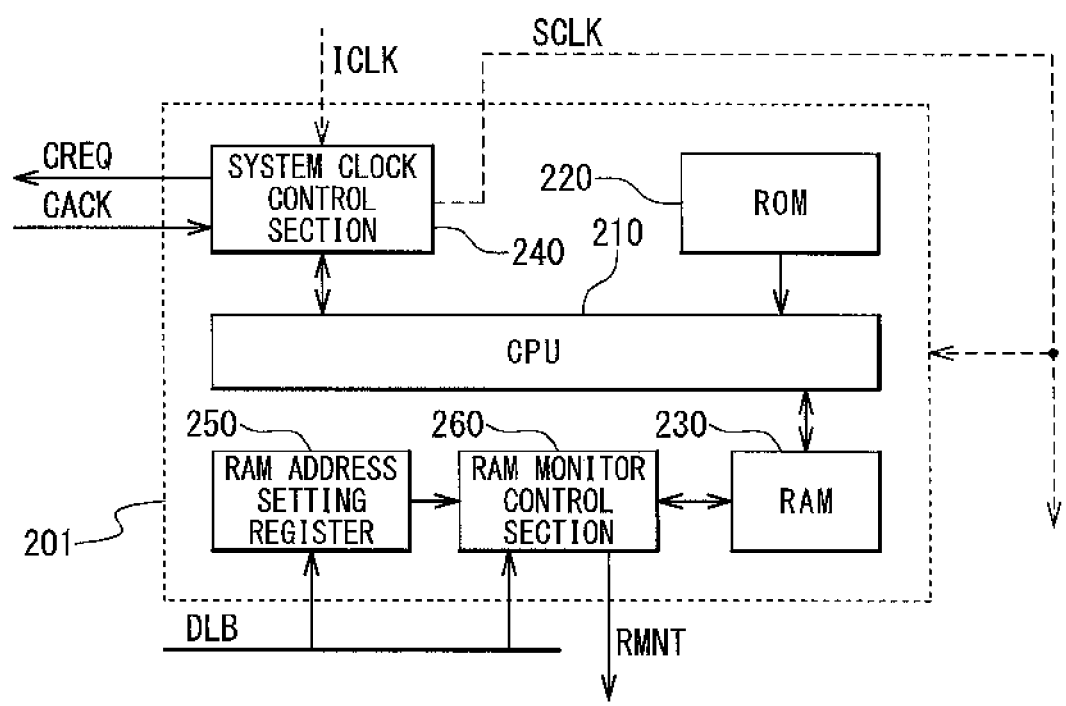
FIG. 2 is a block diagram showing a configuration of a CPU section 201.

FIG. 2 is a block diagram showing a configuration of the CPU section 201. The CPU section 201 includes a CPU 210, a ROM 220, a RAM 230, a system clock control section 240, a RAM address setting register 250 and a RAM monitor control section 260, and supports the RAM monitor function as a debugging function. The ROM 220 is a read-only memory that stores a user application program therein. The RAM 230 is a random access memory that holds data needed to execute the user application program therein. The RAM 230 has an access port from the CPU 210 and an access port from the RAM monitor control section 260. The CPU 210 is a central processing unit that executes the user application program stored in the ROM 220.

The RAM address setting register 250 is a register that holds an address for an access to the RAM 230 for the debugging operation. The address to be accessed is set in the RAM address setting register 250 through a debug local bus DLB. The set address is notified to the RAM monitor control section 260. The RAM monitor control section 260 generates access cycles to the RAM 230 based on the RAM address notified from the RAM address setting register 250. Data acquired as a result of the access is outputted to the transmitting section 401 by a RAM monitor data signal RMNT. The access to the RAM 230 is performed by setting a RAM access start control bit in the RAM monitor control section 260 through the debug local bus DLB.

The system clock control section 240 outputs the system clock signal SCLK generated based on inputted clock signal ICLK. That is, the system clock control section 240 has a function of frequency-dividing the clock signal ICLK and stopping the clock signal, and can be set from the CPU 210. Further, the system clock control section 240 outputs a clock rate change request signal CREQ before performing a change of the clock rate such as the frequency division and the clock stop. After that, when a clock rate change acknowledge signal CACK outputted from the transmitting and receiving section 301 in response to the clock rate change request signal CREQ is set active, the system clock control section 240 changes the clock rate. In the present embodiment, the clock rate of the system clock signal not subjected to the frequency-division is referred to as a "high-speed system clock rate", the clock rate of the system clock signal subjected to the frequency-division is referred to as a "low-speed system clock rate", and a state where the system clock signal is stopped is referred to as "system clock stop". As a matter of course, in the "system clock stop" state, the CPU section 201 stops its operation. Cancellation of the "system clock stop" state is performed in response to input of a reset request, and an interrupt, or the like to the CPU section 201. In an initial state, the "high-speed system clock rate" has been set.

Figure 3:
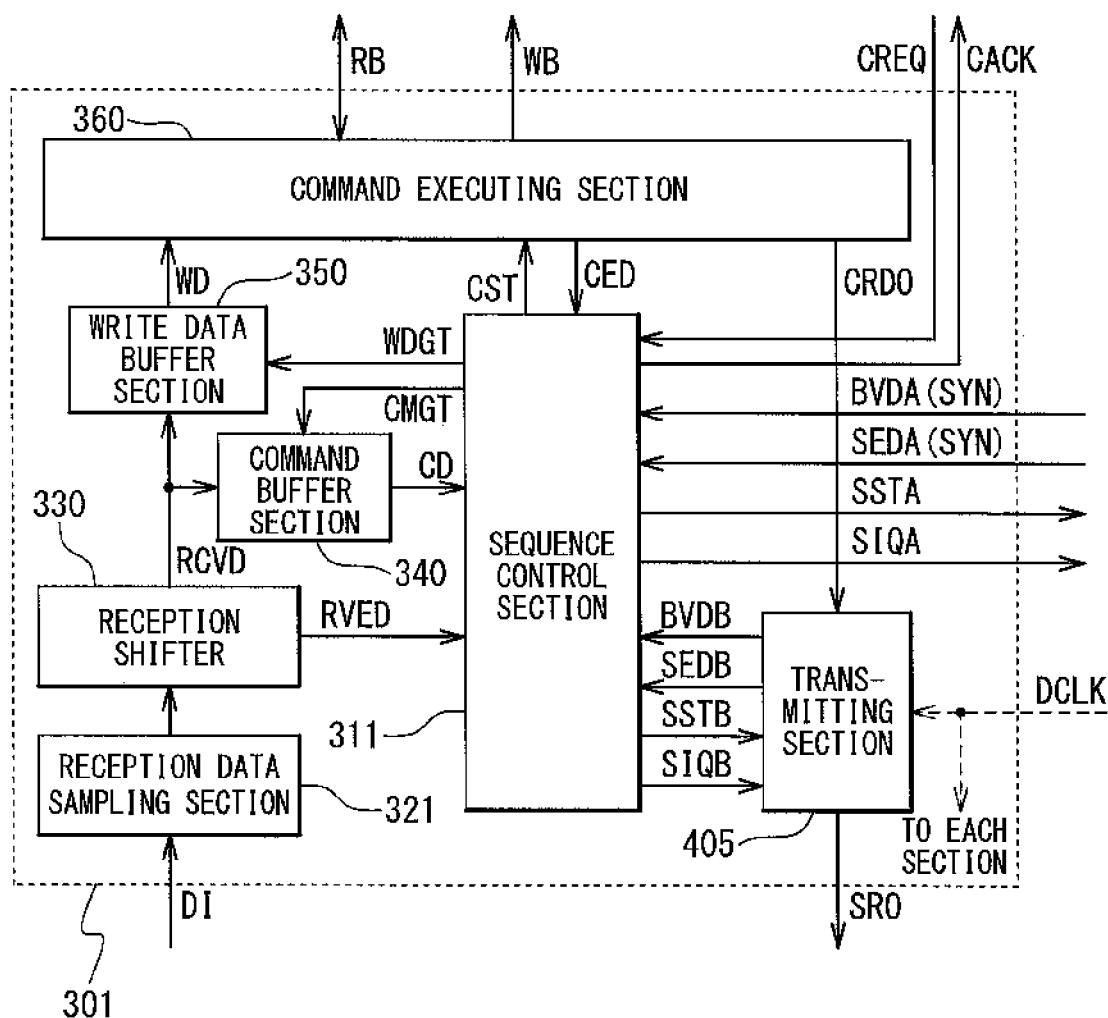
FIG. 3 is a block diagram showing a configuration of a transmitting and receiving section 301.

As shown in FIG. 3, the transmitting and receiving section 301 includes a sequence control section 311, a transmitting section 405, a reception data sampling section 321, a reception shifter 330, a command buffer section 340, a write data buffer section 350 and a command executing section 360. The sequence control section 311 plays a main role for achieving RAM monitor processing, and performs a transmission/reception procedure control, command analysis, instruction of execution of a command, clock rate change acknowledge control of the system clock control section 240 and instruction of addition of an INFO bit. Detailed operations will be described later.

The reception data sampling section 321 asynchronously samples a debug communication input signal DI representing data transferred from the external tool 501 based on the debug clock signal DCLK and outputs acquired 1-bit data to the reception shifter 330. The reception data sampling section 321 also has a function of detecting a start bit (STR bit) and a stop bit (STP bit) for recognizing start and end of reception. A 2-bit data value of the stop bit is outputted to the reception shifter 330, while the start bit is used only to detect start of reception and is not outputted as 1-bit data.

The reception shifter 330 is an 11-bit shift register that receives 1-bit data from the reception data sampling section 321 and shifts one by one bit to perform serial-parallel conversion. When shifted for 11 bits, the reception shifter 330 outputs bit 0 to bit 7 as reception data by a reception data signal RCVD. At the same time, the reception shifter 330 activates a reception end signal RVED and notifies that the receive data has been received from the external tool 501 to the sequence control section 311.

When a command get signal CMGT is set active, the command buffer section 340 receives 8-bit reception data by the reception data signal RCVD, extracts a command code (CMD [0:1]) from the received data and outputs the extracted command code to the sequence control section 311 by a command data signal CD.

When a write data get signal WDGT is set active, the write data buffer section 350 receives 8-bit reception data by the reception data signal RCVD and outputs the reception data to the command executing section 360 by a write data signal WD.

When a command execution start signal CST is set active, the command executing section 360 performs an operation corresponding to each command. The command execution start signal CST contains command data on processing. When the command processing is ended, the command executing section 360 outputs a command execution end signal CED to the sequence control section 311. For example, when the command data on processing indicates a write data transfer command "02H" (RAM address setting register write), the command executing section 360 receives data by the 8-bit write data signal WD and outputs the data to a command executing section write bus WB. After outputting the data, the command executing section 360 outputs the command execution end signal CED. When the command data indicates a read data transfer command "00H" (clock rate display register read), the command executing section 360 receives 8-bit data through a command executing section read bus RB, outputs the data to the transmitting section 405 by a command executing section read data output signal CRDO and outputs the command execution end signal CED to the sequence control section 311. The notation such as "00H" represents hexadecimal number.

Figure 4:
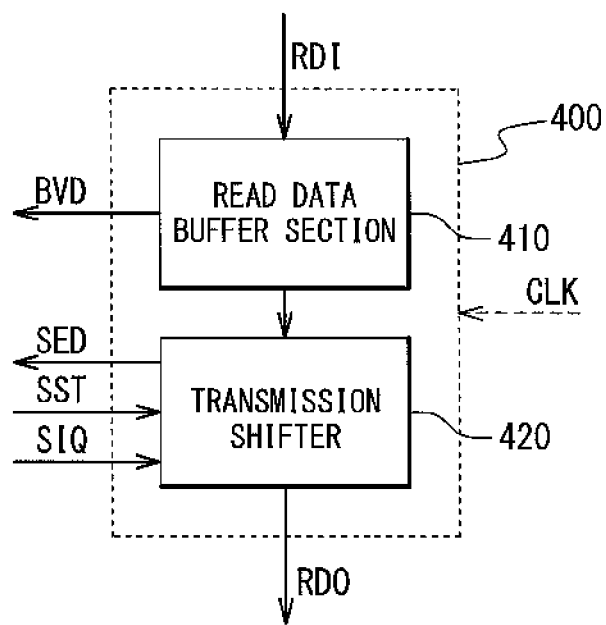
FIG. 4 is a block diagram showing a configuration of a transmitting section 400.

FIG. 4 is a block diagram showing a configuration of a transmitting section 400. The transmitting section 405 built in the transmitting and receiving section 301 and the transmitting section 401 have the same configuration as that of the transmitting section 400 shown in FIG. 4, and include a read data buffer section 410 and a transmission shifter 420. The read data buffer section 410 receives and holds 8-bit data by a data input signal RDI and outputs a read buffer section valid signal BVD. Here, the data input signal RDI corresponds to the command executing section read data output signal CRDO supplied from the command executing section 360 in a case of the transmitting section 405, and corresponds to the RAM monitor data signal RMNT outputted from the CPU section 201 in a case of the transmitting section 401. A read buffer section valid signal BVD corresponds to the read buffer section valid signal BVDB outputted to the sequence control section 311 in the case of the transmitting section 405, and corresponds to the read buffer section valid signal BVDA outputted to the sequence control section 311 through a synchronizing circuit 140 in the case of the transmitting section 401.

The transmission shifter 420 is a 12-bit shift register. When a transmission start signal SST is set active, 8-bit data stored in the read data buffer section 410 is set to the transmission shifter 420 and is shifted and outputted as a transmitting section output signal RDO at the clock rate of the inputted clock signal CLK according to a read data transfer format shown in FIGS. 8A to 8D. When an INFO information setting request signal SIQ is set active in the shift and output, the transmission shifter 420 sets an INFO bit at bit 9 to "1" in an active state. When the shift and output of 12-bit data is completed, the transmission shifter 420 activates a transmission end signal SED. Here, the inputted clock signal CLK corresponds to the system clock signal SCLK in the case of the transmitting section 401, and corresponds to the debug clock signal DCLK in the case of the transmitting section 405. The transmission start signal SST corresponds to a transmission start signal SSTA(SYN) in the case of the transmitting section 401 and corresponds to a transmission start signal SSTB in the case of the transmitting section 405. The transmitting section output signal RDO corresponds to a transmitting section output signal SDO in the case of the transmitting section 401 and corresponds to a transmitting section output signal SRO in the case of the transmitting section 405. The INFO information setting request signal SIQ corresponds to an INFO information setting request signal SIQA(SYN) in the case of the transmitting section 401 and corresponds to an INFO information setting request signal SIQB in the case of the transmitting section 405. The transmission end signal SED corresponds to a transmission end signal SEDA in the case of the transmitting section 401 and corresponds to a transmission end signal SEDB in the case of the transmitting section 405.

Figure 5:
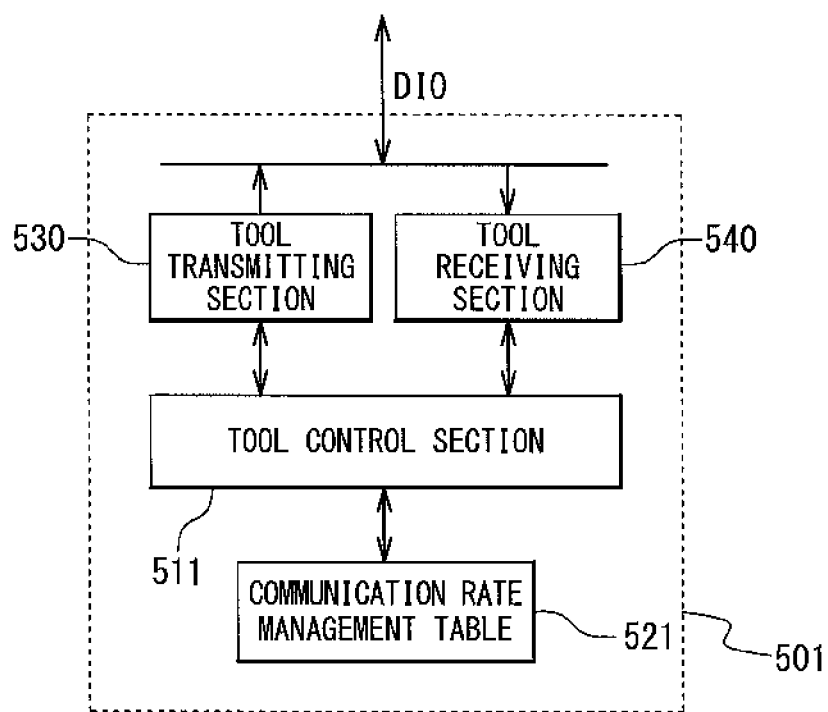
FIG. 5 is a block diagram showing a configuration of an external tool 501.

FIG. 5 is a block diagram showing a configuration of the external tool 501. The external tool 501 includes a tool control section 511, a communication rate management table 521, a tool transmitting section 530 and a tool receiving section 540. The tool transmitting section 530 transmits data from the external tool 501 to the microcontroller 101 by a debug communication input/output signal DIO based on a predetermined transfer format. The tool receiving section 540 receives data transmitted from the microcontroller 101 to the external tool 501 by the debug communication input/output signal DIO based on the predetermined transfer format. Referring to the communication rate management table 521, the tool control section 511 controls the communication rate at this time.

FIG. 6 shows a configuration of the communication rate management table 521. The communication rate management table 521 store data of a transmission clock rate and a reception clock rate in communication with the microcontroller 101 in associated with codes of commands CMD. Referring to the table, the tool control section 511 appropriately switches the transmission clock rate and the reception clock rate based on each issued command. The tool control section 511 updates contents of the table according to necessity.

FIG. 7 shows contents of commands described in the present embodiment. The RAM monitor function described in the present embodiment is achieved by issuing these commands from the external tool 501 and processing the commands by the microcontroller 101.

FIGS. 8A to 8D are diagrams showing read/write transfer formats in communication between the microcontroller 101 and the external tool 501 by using the debug communication input/output signal DIO. The start bit (STR) fixed to "0" is allocated to bit 0, 8-bit data is allocated to bits 1 to 8, predetermined data is allocated to bit 9 and the stop bit (STP) fixed to "1" is allocated to bits 10 to 11. The command that is issued by the external tool 501 and executed by the microcontroller 101 is transferred in the transfer format. As shown in FIG. 8A, according to a read command transfer format, the code of the command CMD is allocated to bits 1 to 2 and bits 3 to 8 are not used. Bit 9 is fixed to "0". As shown in FIG. 8B, according to a read data transfer format, transferred 8-bit read data is allocated to bits 1 to 8. The INFO bit indicating that the clock rate display register 120 has been updated is allocated to bit 9 according to the read data transfer format. According to a write command transfer format, as shown in FIG. 8C, the code of the command CMD is allocated to bits 1 to 2 and bits 3 to 8 are not used. Bit 9 is fixed to "0". According to a write data transfer format, as shown in FIG. 8D, the transferred 8-bit write data is allocated to bits 1 to 8.

Next, the outline of operation in the present embodiment will be described. The transmitting and receiving section 301 and the transmitting section 401 asynchronously communicate with the external tool 501 by use of the debug communication input/output signal DIO by use of a single pin. The communication is performed according to the read/write transfer format shown in FIGS. 8A to 8D.

The write transfer is performed as follows. When the command code (CMD [0:1]) shown in FIG. 7 requiring the write transfer is transferred from the external tool 501 to the transmitting and receiving section 301, the transmitting and receiving section 301 receives and analyzes the command, and then, executes the command. For example, when the command code (CMD [0:1]) is "02H" (RAM address setting register write), the transmitting and receiving section 301 receives data transferred from the external tool 501 after the transfer of the command and outputs the data to the debug local bus DLB through the synchronizing circuit 130 to perform a write cycle. The transferred data is written into the RAM address setting register 250 provided in the CPU section 201.

The read transfer is performed as follows. When the command code (CMD [0:1]) shown in FIG. 7 requiring the read transfer is transferred from the external tool 501 to the transmitting and receiving section 301, the transmitting and receiving section 301 receives and analyzes the command, and then, executes the command. For example, when the command code (CMD [0:1]) is "03H" (RAM monitor read), the transmitting and receiving section 301 outputs control data to the debug local bus DLB through the synchronizing circuit 130 to perform the write cycle and instructs the RAM monitor control section 260 to start read access to the RAM 230.

In response to an instruction from the transmitting and receiving section 301, the RAM monitor control section 260 performs the read access to the RAM 230 based on a RAM address held in the RAM address setting register 250. Data acquired as a result of the read access is outputted to the transmitting section 401 by the RAM monitor data signal RMNT. The transmitting section 401 outputs the RAM monitor data by the transmitting section output signal SDO at the clock rate of the system clock signal SCLK. The RAM monitor data is transferred according to the transfer format shown in FIG. 8B. A bus for the transmitting section output signal SDO is tri-state bus connected with a bus for the debug communication input/output signal DIO. Accordingly, the RAM monitor data outputted from the transmitting section 401 is transferred to the external tool 501 by the debug communication input/output signal DIO.

After transferring the command "03H" (RAM monitor read) to the microcontroller 101, the external tool 501 prepares to acquire the RAM monitor data outputted from the microcontroller 101 by the debug communication input/output signal DIO. In other words, referring to the communication rate management table 521, the tool control section 511 sets to the tool receiving section 540, the reception clock rate used to receive data to be transferred in response to the command "03H". After that, the tool receiving section 540 receives the RAM monitor data outputted from the CPU section 201 to the external tool 501 by the debug communication input/output signal DIO. Then, the external tool 501 displays the acquired RAM monitor data on a display unit or the like to inform the RAM monitor data to the user who debugs.

Similarly, when the command code (CMD [0:1]) is "00H" (clock rate display register read), the transmitting and receiving section 301 reads data set to the clock rate display register 120 through the command executing section read bus RB. The transmitting section 405 outputs the read data by a transmitting and receiving section output signal SRO at a debug clock rate.

After transferring the command "00H" (clock rate display register read) to the microcontroller 101, the external tool 501 prepares to acquire data outputted from the microcontroller 101 by the debug communication input/output signal DIO. In other words, referring to the communication rate management table 521, the tool control section 511 sets to the tool receiving section 540, the reception clock rate used to receive the data to be transferred in response to the command "00H". After that, the tool receiving section 540 receives the data outputted from the microcontroller 101 to the external tool 501 by the debug communication input/output signal DIO. The acquired data is used to control a reception rate of the tool receiving section 540.

The microcontroller 101 has a function of decreasing the clock rate to shift to the low power consumption mode. Thus, the microcontroller 101 may decrease the system clock rate during debug processing including the above-mentioned communication processing. In this case, the rate of the system clock signal SCLK is changed according to a following procedure.

For example, an example is given where, before or during processing of the command "03H" (RAM monitor read), the CPU 210 requests the system clock control section 240 to change the clock rate. In this case, the system clock control section 240 activates the clock rate change request signal CREQ, informs it to the transmitting and receiving section 301 and sets data indicating the changed rate to the clock rate display register 120.

When the clock rate change request signal CREQ is set active, the transmitting and receiving section 301 activates the INFO information setting request signal SIQA, and informs it to the transmitting section 401. When the INFO information setting request signal SIQA is set active, the transmitting section 401 activates the INFO bit at bit 9 to the active state ("1") and performs a read data transfer.

When the INFO bit of received data is set active, the external tool 501 issues the command "00H" (clock rate display register read), and acquires and analyzes contents of the clock rate display register 120. When a "request" bit at bit 7 is set active (refer to FIG. 7), the external tool 501 updates the reception clock rate column of the command "03H" in the communication rate management table 521 according to the system clock rate displayed at bit 0 to bit 2 (refer to FIG. 6). Hereinafter, when the command "03H" is issued to receive the RAM monitor data, the updated reception clock rate data is used. Accordingly, the tool receiving section 540 can normally receive the data at the changed system clock rate.

Once read, the "request" bit at bit 7 is automatically cleared. When the system clock rate displayed at bit 0 to bit 2 represents "system clock stop", the external tool 501 repeatedly reads the clock rate display register 120 and waits until the system clock rate represents "high-speed system clock rate" or "low-speed system clock rate".

When transmission of the data including the INFO bit from the transmitting section 401 is completed, the transmitting section 401 informs the transmission end signal SEDC to the transmitting and receiving section 301 to indicate end of transmission through the synchronizing circuit 140. When notified of the end of transmission from the transmitting section 401, the transmitting and receiving section 301 activates the clock rate change acknowledge signal CACK transmitted to the system clock control section 240 of the CPU section 201. When the clock rate change acknowledge signal CACK is set active, the system clock control section 240 changes the clock rate of the system clock signal SCLK.

Figure 9:
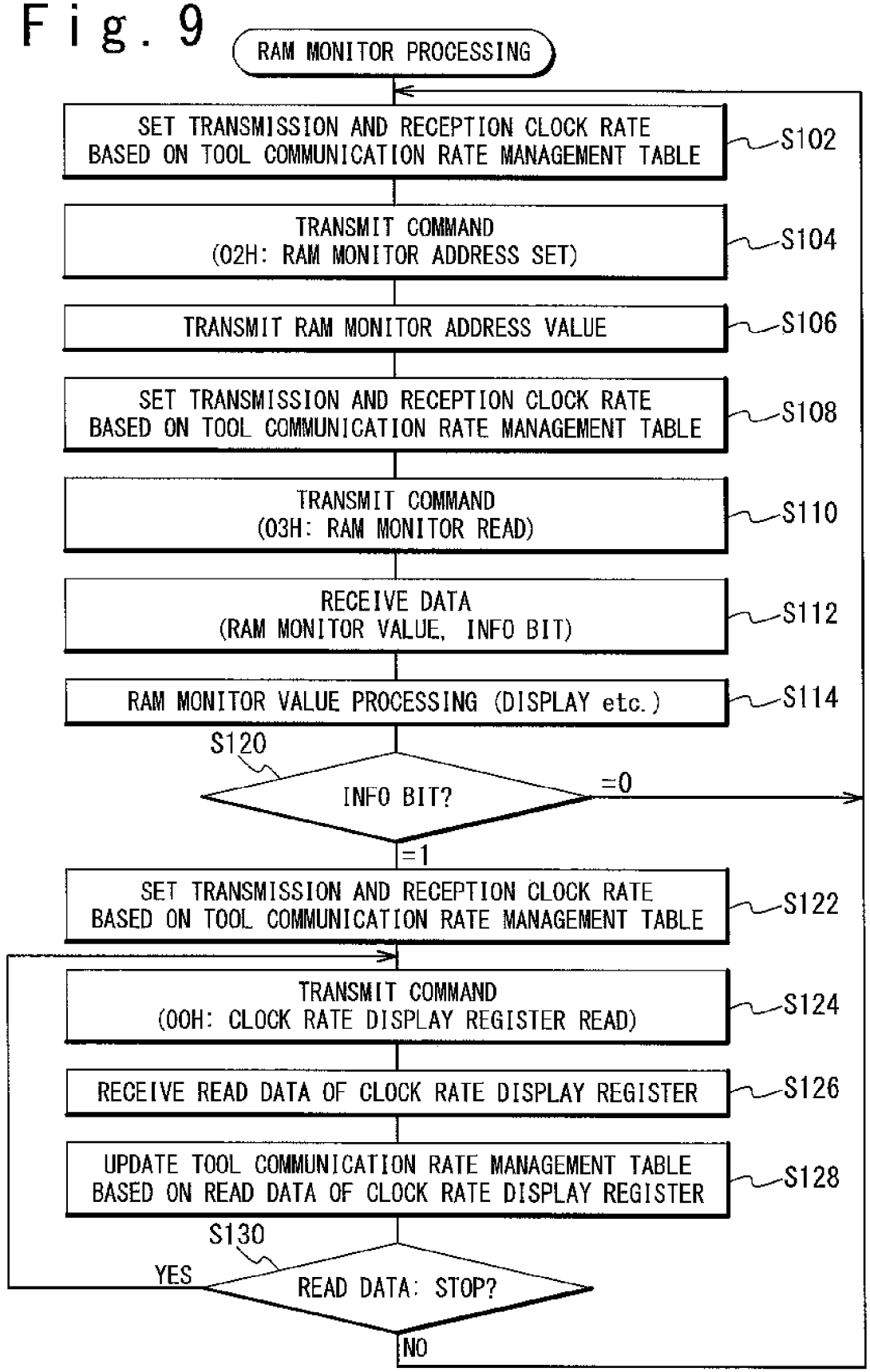
FIG. 9 is a flowchart showing an operation of the external tool 501.
Figure 10:
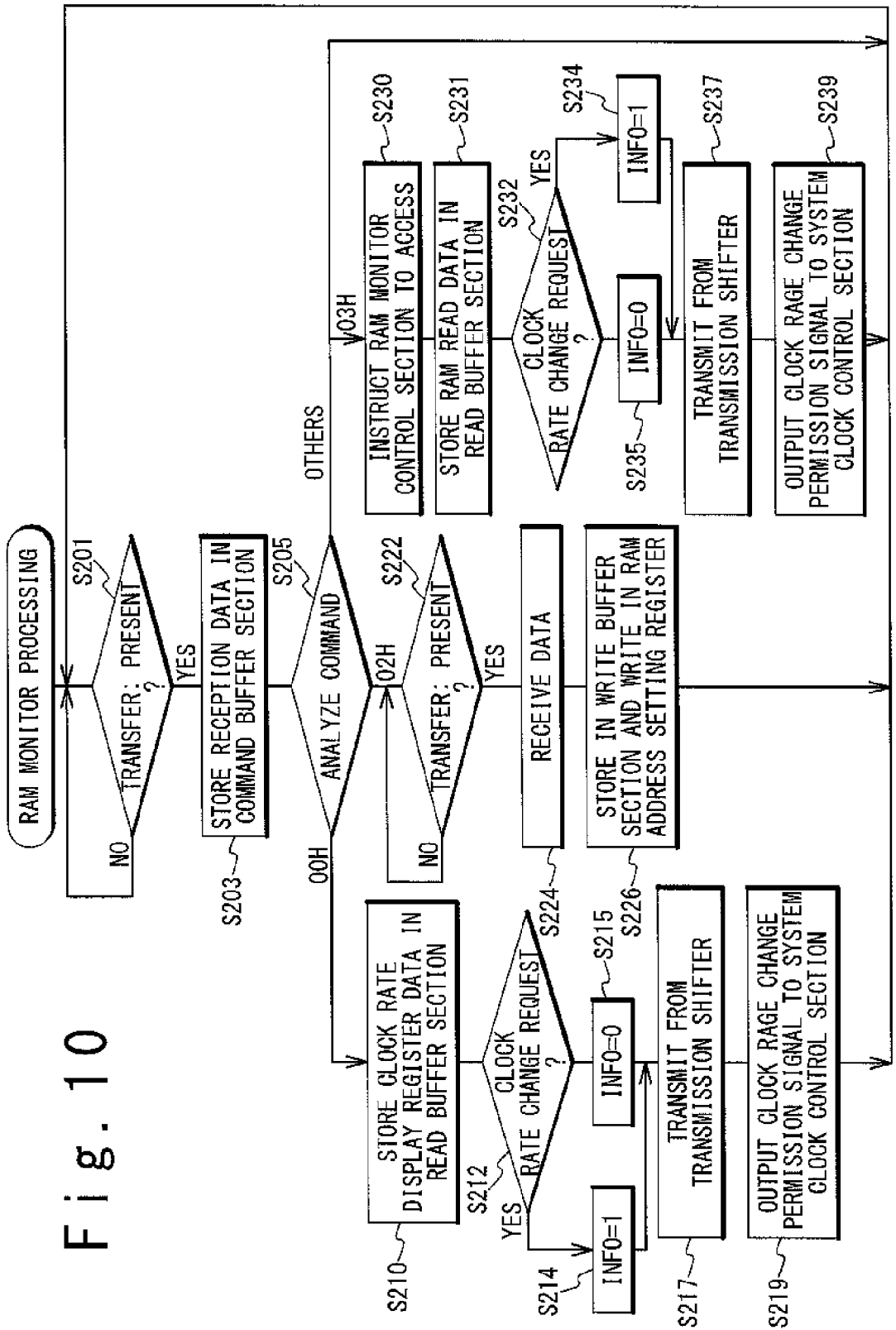
FIG. 10 is a flowchart showing operations of the transmitting and receiving section 301.

Further, the detailed operation of each section will be described. FIGS. 9 and 10 show an operation for command processing needed to achieve the RAM monitor function and an operation for change acknowledge control of the system clock signal SCLK.

FIG. 9 is a flowchart showing an operation of the external tool 501 in the RAM monitor function and change acknowledge control of the system clock signal SCLK. Referring to FIG. 9, the operation of the external tool 501 will be described.

At Step S102, referring to the communication rate management table 521, the tool control section 511 sets the clock rate suitable for write command transfer and write data transfer in issuing the command "02H" (RAM address setting register write) to the tool transmitting section 530. In a case of the command "02H", as shown in FIG. 6, the transmission clock rate becomes "debug clock rate".

At Step S104, CMD [0:1]="02H" is transmitted to the microcontroller 101 by the debug communication input/output signal DIO at the debug clock rate.

At Step S106, a desired 8-bit RAM address value is transmitted by the debug communication input/output signal DIO at the debug clock rate.

At Step S108, referring to the communication rate management table 521, the tool control section 511 sets the clock rate suitable for read command transfer and read data transfer in issuing the command "03H" (RAM monitor read) to the tool transmitting section 530 and the tool receiving section 540. In a case of the command "03H", as shown in FIG. 6, the transmission clock rate becomes "debug clock rate" and the reception clock rate becomes "high-speed system clock rate (initial value)".

At Step S110, the tool transmitting section 530 transmits data of CMD [0:1]=03H to the microcontroller 101 by the debug communication input/output signal DIO at the debug clock rate.

At Step S112, the tool receiving section 540 receives the 8-bit RAM monitor data and the INFO bit that are outputted from the transmitting section 401 of the microcontroller 101 by the debug communication input/output signal DIO at the high-speed system clock rate.

At Step S114, the external tool 501 performs processing to display the received RAM monitor data on a display unit.

At Step S120, the tool control section 511 examines a value of the received INFO bit. When the value of the INFO bit is "0", the control flow returns to Step S102 and the tool control section 511 performs processing to read RAM data to be monitored next. When the value of the INFO bit is "1", that is, when the clock rate display register 120 has been updated, the tool control section 511 performs processing to update the communication rate management table 521 at Step S122 to Step S130.

At Step S122, referring to the communication rate management table 521, the tool control section 511 sets the clock rate suitable for write command transfer and read data transfer in issuing the command "00H" (clock rate display register read) to the tool transmitting section 530 and the tool receiving section 540. In a case of the command "00H", as shown in FIG. 6, the transmission clock rate and the reception clock rate are set to "debug clock rate".

At Step S124, the tool transmitting section 530 transmits data of CMD [0:1]=00H to the microcontroller 101 by the debug communication input/output signal DIO at the debug clock rate.

At Step S126, the tool receiving section 540 receives an 8-bit value in the clock rate display register 120, which is outputted from the transmitting section 405, by the debug communication input/output signal DIO at the debug clock rate.

At Step S128, the tool control section 511 updates the communication rate management table 521 based on the received value of the clock rate display register 120.

At Step S130, the tool control section 511 examines the value of the clock rate display register 120. When bit 2 "stop" is set active, the control flow returns to Step S124, and the tool control section 511 reads the value of the clock rate display register 120 again and waits until bit 0 "high-speed" or bit 1 "low-speed" is set active. This is because in the "system clock stop" state, the CPU section 201 has sopped its operation, and the RAM monitor control section 260 cannot perform the RAM monitor processing. When bit 2 "stop" is not set active, the control flow returns to Step S102 and the tool control section 511 performs processing to read RAM data to be monitored next.

Next, the detailed operation of the transmitting and receiving section 301 will be described, mainly with respect to the transmitting section 405 and the sequence control section 311. FIG. 10 is a flowchart showing the operation of the transmitting and receiving section 301, mainly with respect to the transmitting section 401 and the sequence control section 311.

At Step S201, in order to detect read command transfer or write command transfer, the reception data sampling section 321 monitors the debug communication input signal DI and waits until the STR bit is detected.

At Step S203, the reception data sampling section 321 samples the debug communication input/output signal DIO with a clock signal generated based on the debug clock signal DCLK and outputs acquired 1-bit data to the reception shifter 330. The reception shifter 330 receives the data transmitted from the reception data sampling section 321 while shifting the data one by one bit. Then, when completing the storage of data of 11 bits, the reception shifter 330 outputs a portion of 8-bit data by the reception data signal RCVD, activates the reception end signal RVED, and informs the end of reception to the sequence control section 311. When the reception end signal RVED is set active, the sequence control section 311 activates the command get signal CMGT and instructs the command buffer section 340 to receive a command. When the command get signal CMGT is set active, the command buffer section 340 receives 8-bit data by the reception data signal RCVD and outputs the command data signal CD to the sequence control section 311.

At Step S205, the sequence control section 311 extracts the command portion (2-bit data of CMD [0:1]) of the command data signal CD outputted from the command buffer section 340 and analyzes the command. The control flow proceeds to Step S210 when the command (CMD [0:1]) is "00H", proceeds to Step S222 when the command (CMD [0:1]) is "02H" and branches to Step S230 when the command (CMD [0:1]) is "03H". When the command (CMD [0:1]) is another value, the control flow returns to Step S201 and the sequence control section 311 waits a command input.

At Step S210, the sequence control section 311 activates the command execution start signal CST and instructs the command executing section 360 to execute the command. The command execution start signal CST contains data indicating that the command "00H" (clock rate display register read) is being processed. When the command execution start signal CST is set active, the command executing section 360 performs read access to the clock rate display register 120 through the command executing section read bus RB. When receiving the 8-bit value set to the clock rate display register 120, the command executing section 360 outputs the read data by the command executing section read data output signal CRDO, activates the command execution end signal CED and informs the end of read to the sequence control section 311. When storing the 8-bit data of the command executing section read data output signal CRDO outputted from the command executing section 360 in the internal read data buffer section 410, the transmitting section 405 activates the read buffer section valid signal BVDB and informs to the sequence control section 311, that preparation for transmission is completed.

At Step S212, when the read buffer section valid signal BVDB is set active, the sequence control section 311 examines the state of the clock rate change request signal CREQ. When the clock rate change request signal CREQ is set active, the sequence control section 311 activates the INFO information setting request signal SIQB to the active state ("1") (Step S214). When the clock rate change request signal CREQ is not set active, the sequence control section 311 inactivates the INFO information setting request signal SIQB to an inactive ("0") state (Step S215).

At Step S217, the sequence control section 311 activates the transmission start signal SSTB and instructs the transmitting section 405 to transmit data. The transmitting section 405 stores 12-bit data obtained by combining 8-bit data stored in the read data buffer section 410, 1-bit data designated by the INFO information setting request signal SIQB, 1 bit of STR bit and 2 bits of STP bit in the transmission shifter 420. In synchronization with the debug clock signal DCLK, the transmission shifter 420 shifts and outputs the data as the transmitting and receiving section output signal SRO one by one bit. When the shift and output of 12 bits is completed, the transmission shifter 420 activates the transmission end signal SEDB.

At Step S219, the sequence control section 311 activates the clock rate change acknowledge signal CACK. When the clock rate change acknowledge signal CACK is set active, the system clock control section 240 changes the rate of the system clock signal SCLK. After that, the control flow returns to Step S201 and the transmitting and receiving section 301 waits for a next command.

At Step S222, in order to detect write data transfer, the reception data sampling section 321 monitors the debug communication input/output signal DIO and waits until the STR bit is detected.

At Step S224, the reception data sampling section 321 samples the debug communication input/output signal DIO with a signal generated based on the debug clock signal DCLK and outputs the acquired data to the reception shifter 330. The reception shifter 330 receives the data transmitted from the reception data sampling section 321 while shifting the data one by one bit. When completing the storage of data of 11 bits, the reception shifter 330 outputs the 8-bit data portion by the reception data signal RCVD, activates the reception end signal RVED and informs the end of reception to the sequence control section 311. The sequence control section 311 activates the write data get signal WDGT and instructs the write data buffer section 350 to receive data. The write data buffer section 350 receives the 8-bit data of the reception data signal RCVD and outputs the write data signal WD to the command executing section 360.

At Step S226, the sequence control section 311 activates the command execution start signal CST and informs it to the command executing section 360. The command execution start signal CST contains data indicating that the command "02H" is being processed. When the command execution start signal CST is set active, the command executing section 360 outputs data to be written into the RAM address setting register 250 to the debug local bus DLB through the command executing section write bus WB in order to execute a write cycle. The command executing section 360 activates the command execution end signal CED and informs the end of execution to the sequence control section 311. After that, the transmitting and receiving section 301 returns to Step S201 and waits for a next command.

When the debug local bus DLB is in a state of the write cycle to the RAM address setting register 250, the RAM address setting register 250 receives 8-bit write data from the debug local bus DLB and holds the data therein. The RAM monitor control section 260 is notified of the held contents.

At Step S230, the sequence control section 311 activates the command execution start signal CST and instructs the command executing section 360 to execute the command. The command execution start signal CST contains data indicating that the command "03H" is being processed. When the command execution start signal CST is set active, the command executing section 360 outputs control data indicating that the RAM access start control bit in the RAM monitor control section 260 is set onto the debug local bus DLB through the command executing section write bus WB in order to execute the write cycle. The command executing section 360 activates the command execution end signal CED and informs the end of execution of the command to the sequence control section 311.

At Step S231, when the RAM access start control bit is set, the RAM monitor control section 260 performs read access to the RAM 230 by use of the 8-bit RAM address supplied from the RAM address setting register 250. 8-bit read data acquired as a result of the read access is outputted by the RAM monitor data signal RMNT. The transmitting section 501 stores the 8-bit read data contained in the RAM monitor data signal RMNT in the internal read data buffer section 410, and activates a read buffer section valid signal BVDA. The sequence control section 311 is notified of the read buffer section valid signal BVDA as the read buffer section valid signal BVDA (SYN) through the synchronizing circuit 140.

At Step S232, when the read buffer section valid signal BVDA is set active, the sequence control section 311 examines the state of the clock rate change request signal CREQ. When the clock rate change request signal CREQ is set active, the sequence control section 311 activates the INFO information setting request signal SIQA to the active state ("1") (Step S234). When the clock rate change request signal CREQ is not set active, the sequence control section 311 inactivates the INFO information setting request signal SIQA to the inactive state ("0") (Step S235).

At Step S237, the sequence control section 311 activates the transmission start signal SSTA and informs it to the transmitting section 401 through the synchronizing circuit 140. When the transmission start signal SSTA(SYN) is set active, the transmitting section 401 stores 12-bit data including the 8-bit data stored in the read data buffer section 410, the 1-bit data designated by the INFO information setting request signal SIQA(SYN) inputted through the synchronizing circuit 140, 1 bit of STR bit and 2 bits of STP bit in the transmission shifter 420. In synchronization with the system clock signal SCLK, the transmission shifter 420 shifts and outputs transmission data as the transmitting and receiving section output signal SRO one by one bit. When completing the shift and output of 12 bits, the transmission shifter 420 activates the transmission end signal SEDC. The transmission end signal SEDC as the transmission end signal SEDA(SYN) is notified to the sequence control section 311 through the synchronizing circuit 140 for the end of transmission.

At Step S239, when the transmission end signal SEDA (SYN) is set active, the sequence control section 311 activates the clock rate change acknowledge CACK transmitted to the system clock control section 240 in the CPU section 201. When the clock rate change acknowledge signal CACK is set active, the system clock control section 240 changes the clock rate of the system clock signal SCLK to the system clock rate set by the CPU 210. After that, the control flow returns to Step S201 and the transmitting and receiving section 301 waits for a next command.

As has been described above, according to the present invention, the information processing apparatus includes the transmitting and receiving section 301 that operates based on the generally low-speed nonstop debug clock signal DCLK, the transmitting section 401 that operates based on the generally high-speed system clock with variable clock rate, and the clock rate display register 120 that displays rate data of the rate-variable system clock, and the sequence control section 311 in the transmitting and receiving section 301 has the function of handshaking with the system clock control section 240 in the CPU section 201 and the function of informing data indicating that display contents in the clock rate display register 120 are changed, to the transmitting section 401, so as to transmit the data to the outside. Thereby, the microcontroller can perform a control such that the debug communication rate between the microcontroller and the external tool is synchronized. Therefore, even when the system clock rate is changed in asynchronous with that of debug communication according to the application program, the debug communication is normally performed.

Second Embodiment

Figure 11:
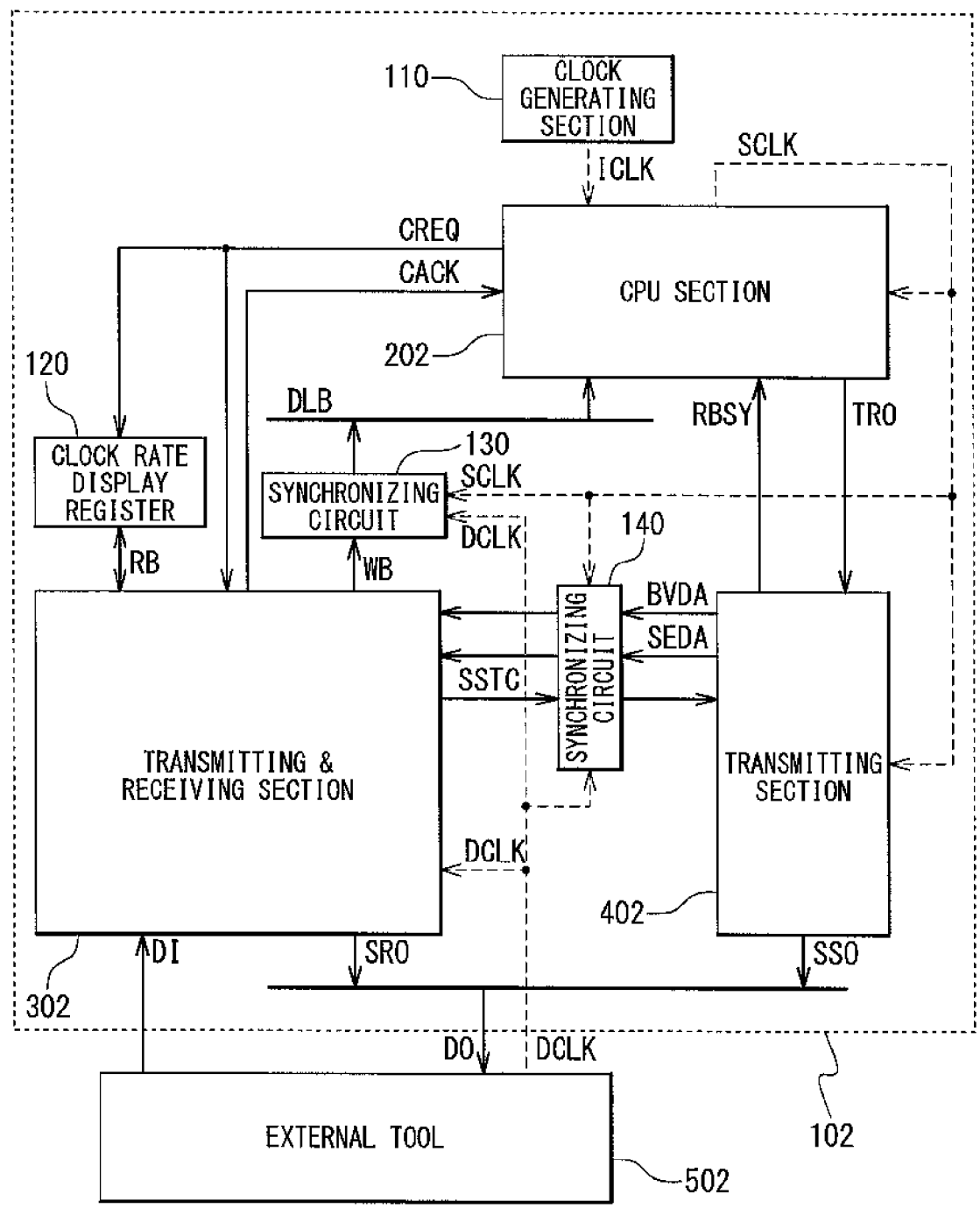
FIG. 11 is a block diagram showing a configuration of the information processing apparatus according to a second embodiment of the present invention.

FIG. 11 shows a configuration of the information processing apparatus according to a second embodiment of the present invention. In the present embodiment, the transmitting and receiving section 301, the transmitting section 401, the CPU section 201 and the external tool 501 in the first embodiment are replaced with a transmitting and receiving section 302, a transmitting section 402, a CPU section 202 and an external tool 502, respectively, and these replaced sections are partially changed from the respective sections in the first embodiment. The debug clock generating section 150 in the first embodiment is omitted and the debug clock signal DCLK is supplied from the external tool 502. Further, no INFO information setting request signal SIQA is outputted from the transmitting and receiving section 302 and the corresponding input to the transmitting section 402 is fixed to be inactive ("0"). Other components are the same as those of the first embodiment and the description thereof is omitted.

Figure 12:
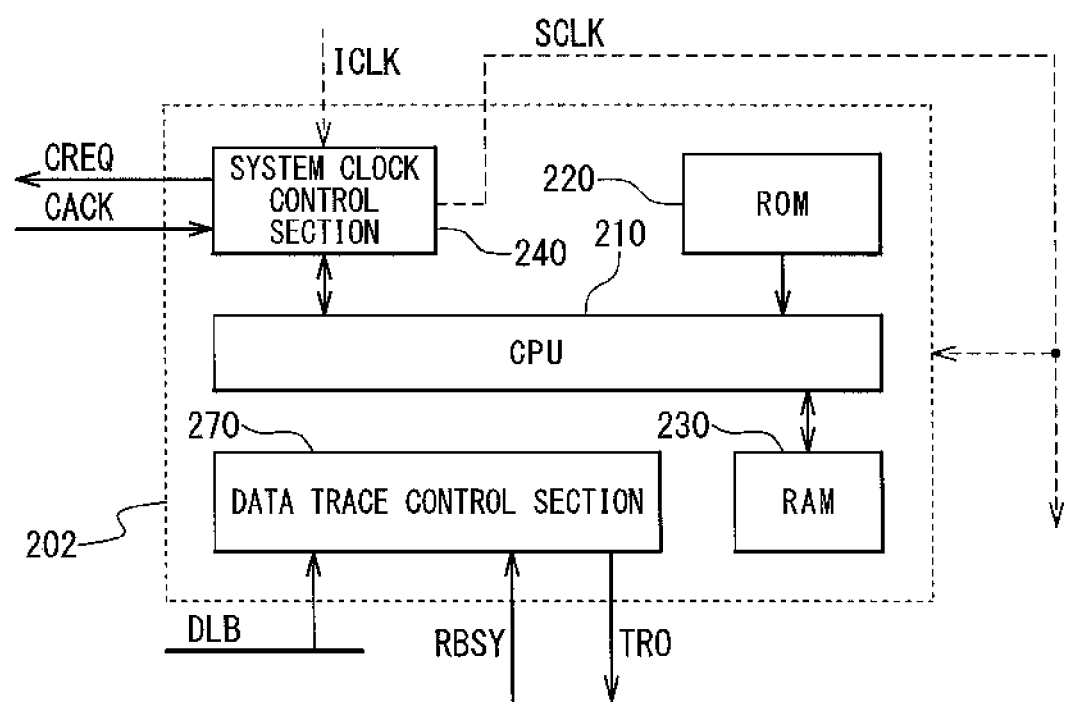
FIG. 12 is a block diagram showing a configuration of a CPU section 202.

FIG. 12 is a block diagram showing a configuration of the CPU section 202 for performing a data trace function as one of debugging functions. The CPU 210, the system clock control section 240, the RAM 230 and the ROM 220 are the same as those of the first embodiment and their operations are the same. However, a debug access port of the RAM 230 is unconnected. The RAM address setting register 250 and the RAM monitor control section 260, which perform the RAM monitor function in the first embodiment, are replaced with a data trace control section 270 for performing the data trace function. The data trace control section 270 monitors an operation of the CPU 210, generates trace data when the CPU 210 issues a store command to the RAM 230 or the like, and outputs the trace data by a trace output signal TRO in synchronization with the system clock signal SCLK. The trace data is 16-bit data in a format A in FIG. 19A. When the clock rate change request signal CREQ outputted from the system clock control section 240 is set active, 8-bit data in a format B in FIG. 19B is generated and outputted by the trace output signal TRO. When data is generated while a read buffer section busy signal RBSY is set active, the data is internally held and then, outputted after the read buffer section busy signal RBSY is set inactive. Setting of validity/invalidity of the data trace control section 270 is performed by operating a control bit in the data trace control section 270 through the debug local bus DLB.

In the present embodiment, to perform the data trace function as one debugging function, the commands shown in FIG. 7 are changed to commands shown in FIG. 16. FIG. 16 shows the commands described in the present embodiment. The data trace function is performed by means of these commands.

Figure 13:
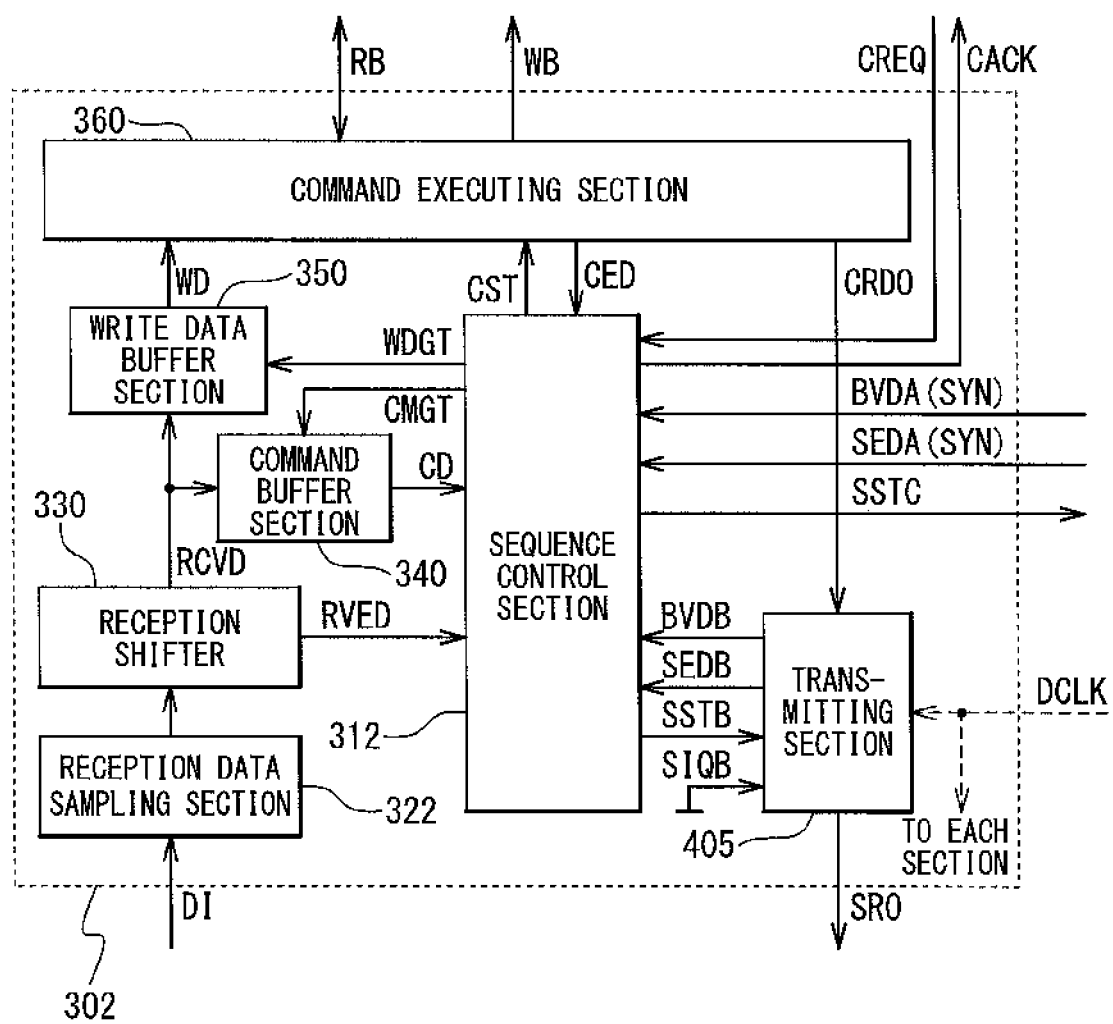
FIG. 13 is a block diagram showing a configuration of a transmitting and receiving section 302.

FIG. 13 is a block diagram showing a configuration of the transmitting and receiving section 302. The transmitting and receiving section 302 includes the sequence control section 312, the transmitting section 405, the reception data sampling section 322, the reception shifter 330, the command buffer section 340, the write data buffer section 350 and the command executing section 360. Among these sections, the reception shifter 330, the write data buffer section 350, the command buffer section 340, the command executing section 360 and the transmitting section 405 are the same as those in the first embodiment, and their operations are the same. The reception data sampling section 322 performs sampling in synchronization with the debug clock signal DCLK. Except for this operation, like the reception data sampling section 321, the reception data sampling section 322 also samples the debug communication input signal DI transferred from the external tool 502 to acquire 1-bit data. Like the sequence control section 311, the sequence control section 312 analyzes the command (CMD [0:2]) supplied from the command buffer section 340 and performs processing corresponding to the command by use of the write data buffer section 350, the command executing section 360, the transmitting section 405, and the clock rate change acknowledge signal CACK.

Figure 14:
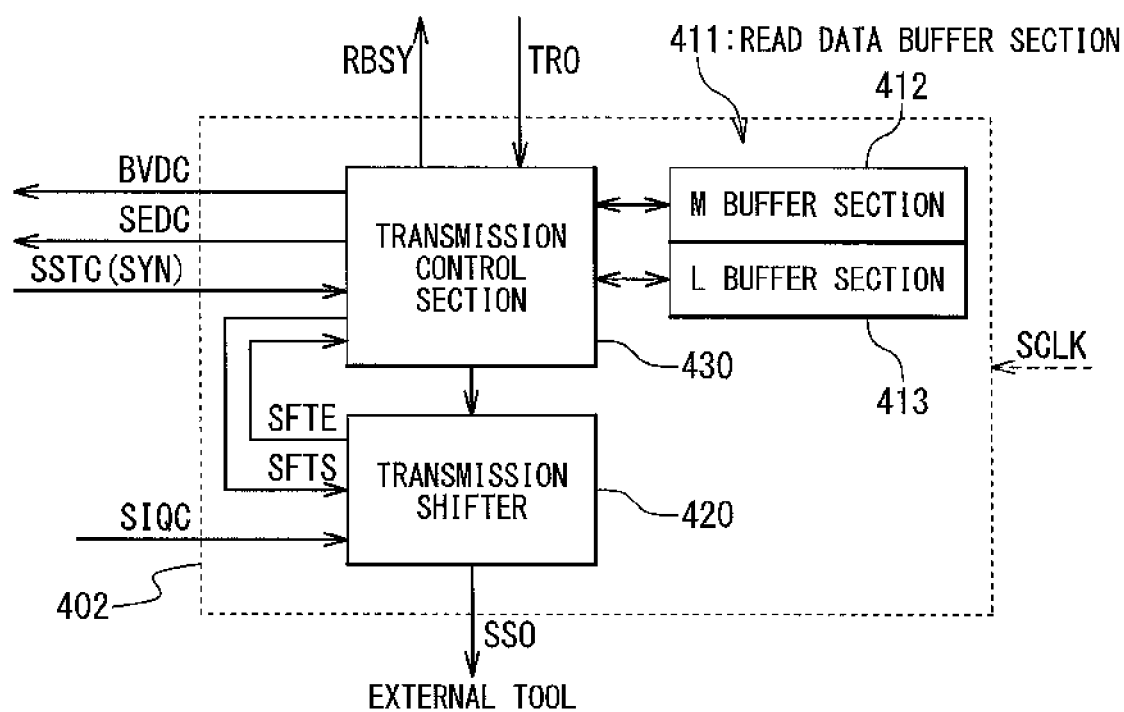
FIG. 14 is a block diagram showing a configuration of a transmitting section 402.

FIG. 14 is a block diagram showing a configuration of the transmitting section 402. The transmitting section 402 includes a transmission control section 430, the transmission shifter 420, and a read data buffer section 411. The transmission shifter 420 is the same as that in the first embodiment and performs the same operation. The read data buffer section 411 is a storage unit including an M buffer section 412 and a L buffer section 413 that each hold 8-bit data. The M buffer section 412 and the L buffer section 413 each hold the 8-bit data written from the transmission control section 430. The transmission control section 430 controls the storage of the trace data and the operation of the transmission shifter 420.

When the trace data supplied from the CPU section 202 by the trace output signal TRO is trace data in the format A (refer to FIG. 19A), the transmission control section 430 stores 8-bit data of bit 0 to bit 7 in the M buffer section 412 of the read data buffer section 411 and 8-bit data of bit 8 to bit 15 in the L buffer section 413 of the read data buffer section 411. The transmission control section 430 activates the read buffer section valid signal BVDC. After that, when the transmission start signal SST is set active, the transmission control section 430 transmits the 8-bit data stored in each of the M buffer section 412 and the L buffer section 413 to the transmission shifter 420 and outputs the data as a transmitting section output signal SSO to the external tool 502. When the transmission shifter 420 completes the output of 16-bit data by the transmitting section output signal SSO, the transmission control section 430 activates the transmission end signal SEDC.

When the trace data supplied by the trace output signal TRO is data in the format B (refer to FIG. 19B), 8-bit data of bit 0 to bit 7 is stored in the M buffer section 412. Then, the transmission control section 430 activates the read buffer section valid signal BVDC. After that, when the transmission start signal SSTC(SYN) is set active, the 8-bit data stored in the M buffer section 412 is transmitted to the transmission shifter 420, activates a shift start signal SFTS and outputs the signal by the transmitting section output signal SSO. When the transmission shifter 420 completes the output of the 8-bit data, the transmission shifter 420 activates a shift end signal SFTE indicating the end of transmission. When detecting the end of transmission from the shift end signal SFTE, the transmission control section 430 activates the transmission end signal SEDC and informs the end of transmission to the transmitting and receiving section 302 (sequence control section 312).

Figure 15:
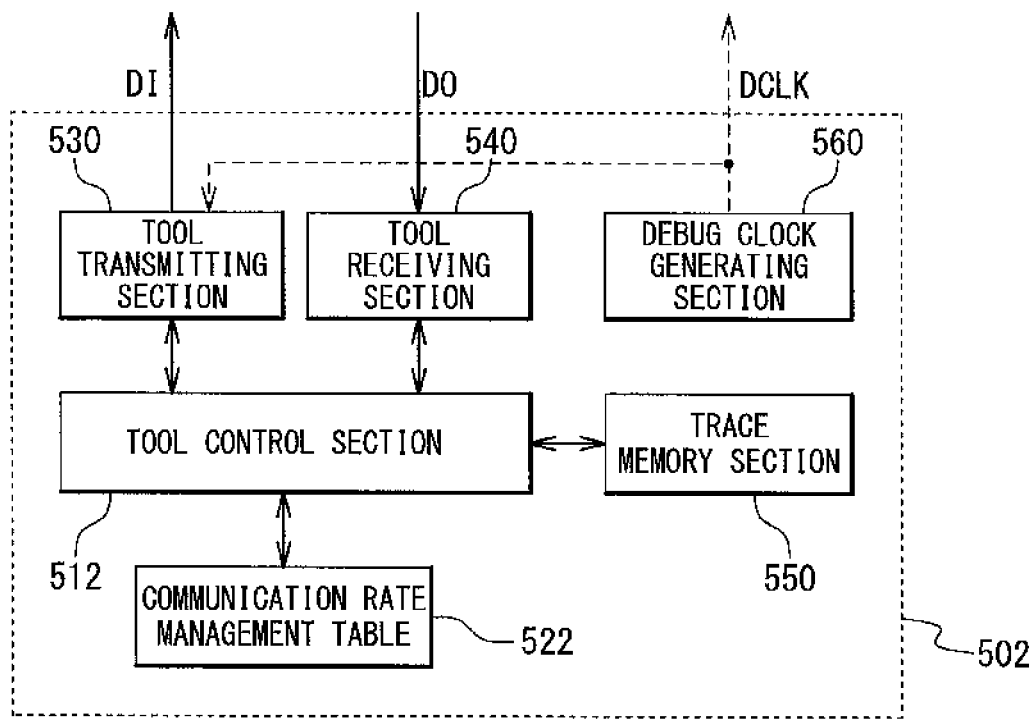
FIG. 15 is a block diagram showing a configuration of an external tool 502.

FIG. 15 is a block diagram showing a configuration of an external tool 502. The external tool 502 includes a tool control section 512, a communication rate management table 522, the tool transmitting section 530, the tool receiving section 540, a trace memory section 550 and a debug clock generating section 560. The tool receiving section 540 is the same as that in the first embodiment and performs the same operation. The tool transmitting section 530 in the present embodiment and that in the first embodiment have different synchronizing clocks. The tool transmitting section 530 in the present embodiment transmits data in the transfer format shown in FIGS. 18A to 18E in synchronization with the debug clock signal DCLK. Like the debug clock generating section 150, the debug clock generating section 560 generates the debug clock signal DCLK. In the present embodiment, the debug clock signal DCLK is supplied to the microcontroller 102 from the external tool 502. The trace memory section 550 is a storage unit for storing the trace data received by the tool receiving section 540 therein. The tool control section 512 controls the reception clock rate with reference to the communication rate management table 522. When the tool receiving section 540 receives the trace data in the format shown in FIG. 19A, the tool control section 512 transmits the trace data to the trace memory section 550 and stores the data in the trace memory section 550. The tool control section 512 further includes the same function as that of the tool control section 511 in the first embodiment.

FIG. 17 is a diagram showing a configuration of the communication rate management table 522. The communication rate management table 522 stores data indicating the transmission clock rate and the reception clock rate in communication with the microcontroller 102 in relation to codes of commands CMD and stores them therein. Like the communication rate management table 521 in the first embodiment, the communication rate management table 522 is referred in communication with the microcontroller 102. In the present embodiment, to describe the data trace function as one debugging function, some commands are changed. Since the transmission clock rate and the reception clock rate of the command (CMD [0:2]) "00H" are generated by the debug clock generating section 560 of the external tool 502, the clock rates are fixed to debug clock rates. However, the clock rates may be variable.

Figure 18A:
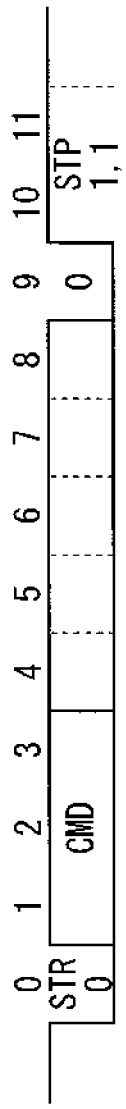
FIGS. 18A to 18E are diagrams showing transfer formats in communication between a microcontroller 102 and an external tool 502.
Figure 18B:
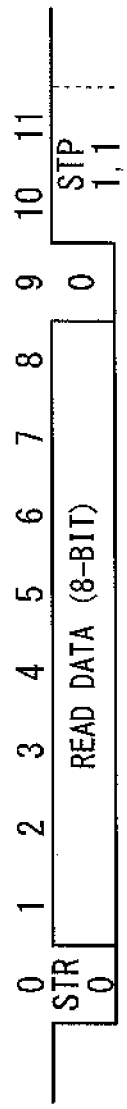
Figure 18C:
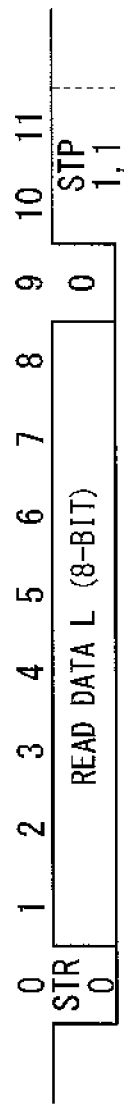
Figure 18D:
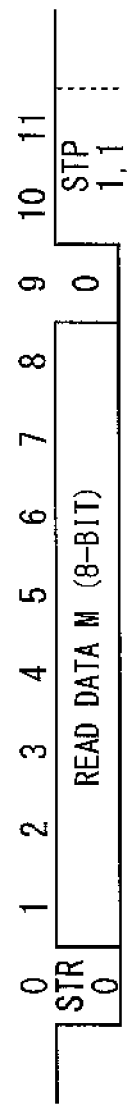
Figure 18E:
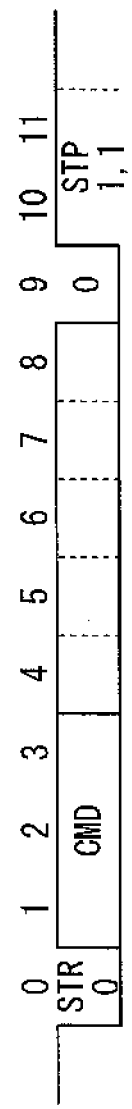

FIGS. 18A to 18E are diagrams showing transfer formats in communication between the microcontroller 102 and the external tool 502 by the debug communication input signal DI and a debug communication output signal DO. The transfer formats includes a read command transfer format (FIG. 18A), a read data transfer format (FIG. 18B), data trace transfer formats (FIGS. 18C and 18D), and a control command transfer format (FIG. 18E). As shown in FIGS. 18C and 18D, the transmission of 16-bit data in transfer of the data trace is achieved by transmitting 8-bit data twice. When the data trace control section 270 generates multiple of 16-bit trace data, trace transfer L and trace transfer M are repeatedly performed. Similarly, when 8-bit trace data is generated, the trace transfer L is repeatedly performed. The INFO bit at bit 9 allocated for read data transfer in the first embodiment is unused and fixed to "0".

FIGS. 19A to 19C show formats of transmitted/received data. FIG. 19A shows a data format (format A) of 16-bit trace data generated by the data trace control section 270. FIG. 19B shows a format (format B) of 8-bit data indicating that the clock rate change request signal CREQ outputted from the system clock control section 240 has been set active. The trace data in the format B serves as a substitute for the INFO bit information in the first embodiment. FIG. 19C shows data represented by TCODE allocated to bits 0 to 2 in each format.

Figure 20:
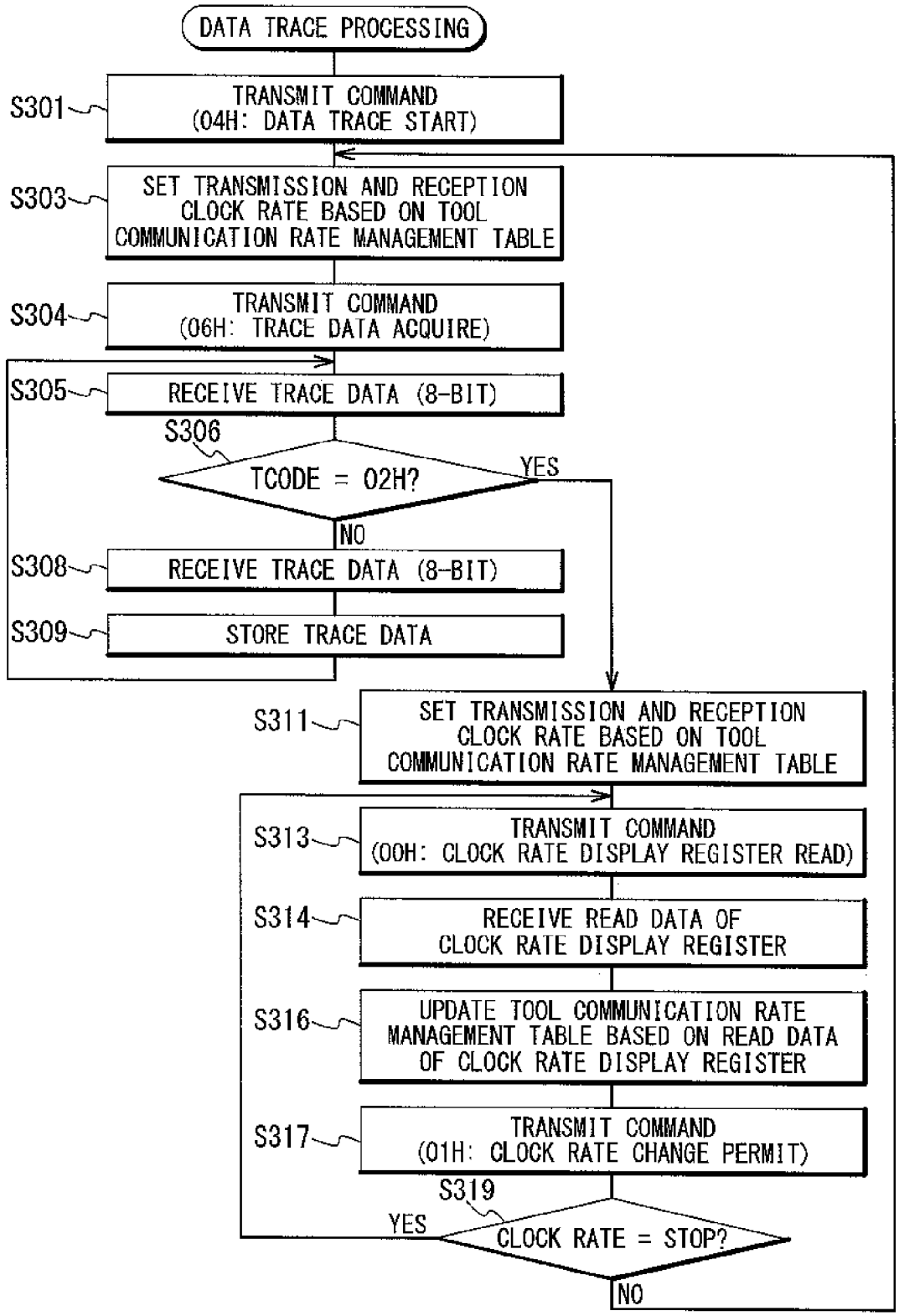
FIG. 20 is a flowchart showing an operation of the external tool 502.

The operation in achieving the data trace function and change acknowledge control of the system clock signal SCLK will be described. FIG. 20 is a flowchart showing the operation of the external tool 502.

At Step S301, the tool control section 512 transmits CMD [0:2]=04H ("data trace start") as control command data to the microcontroller 102 by the debug communication input signal DI in synchronization with the debug clock signal DCLK.

At Step S303, referring to the communication rate management table 522, the tool control section 512 sets the reception clock rate suitable for the command "06H" to be transferred next (trace transfer L, trace transfer M) to the tool receiving section 540.

At Step S304, the tool control section 512 transmits CMD [0:2]=06H ("trace data acquisition") as read command data to the microcontroller 102 by the debug communication input signal DI in synchronization with the debug clock signal DCLK.

At Step S305, as a result of execution by the CPU 210, since the trace data generated by the data trace control section 270 is transferred by the debug communication output signal DO, the tool receiving section 540 receives the trace data. The trace data is lower 8-bit trace data in the format A or 8-bit trace data in the format B. The received trace data is temporarily stored in the tool control section 512.

At Step S306, the tool control section 512 analyzes TCODE [0:1] contained in the 8-bit data received by the tool receiving section 540. In a case of TCODE [0:1]=01H, upper 8-bit trace data in the format A, which is subsequently transferred, is received by the tool receiving section 540 (Step S308). The tool control section 512 recovers the trace data in the format A based on the 8-bit trace data received at Step S308 and the 8-bit trace data received at Step S305 and stores the recovery data in the trace memory section 550 (Step S309).

In a case of TCODE [0:1]=02H, the microcontroller 102 requests change of the clock rate. Accordingly, the following processing is performed.

At Step S311, referring to the communication rate management table 522, the tool control section 512 sets the reception clock rate suitable for read data transfer of the command "00H" to be transferred next to the tool receiving section 540.

At Step S313, the tool control section 512 issues CMD [0:2]=00H ("clock rate display register read") as the read command data, and the tool transmitting section 530 transmits the command to the microcontroller 102 by the debug communication input signal DI in synchronization with the debug clock signal DCLK.

At Step S314, the tool receiving section 540 receives data supplied at the debug clock rate by the debug communication output signal DO. The received data is an 8-bit value in the clock rate display register 120.

At Step S316, the tool control section 512 updates the communication rate management table 522 in accordance with the received value of the clock rate display register 120.

At Step S317, the tool control section 512 issues CMD [0:2]=01H ("clock rate change acknowledgement") as the control command. The tool transmitting section 530 transmits the command to the microcontroller 102 by the debug communication input signal DI in synchronization with the debug clock signal DCLK.

At Step S319, the tool control section 512 examines the received value of the clock rate display register 120 and the control flow returns to Step S313 when bit 2 "stop" is set active. The tool control section 512 reads the value of the clock rate display register 120 again and waits until bit 0 "high-speed" or bit 1 "low-speed" is set active. Since the data trace control section 270 is stopped in the "system clock stop" state, no trace data is generated. When the "system clock stop" state is cleared (No in Step S319), the control flow returns to Step S303 and the tool control section 512 restarts processing to acquire the trace data.

Figure 21:
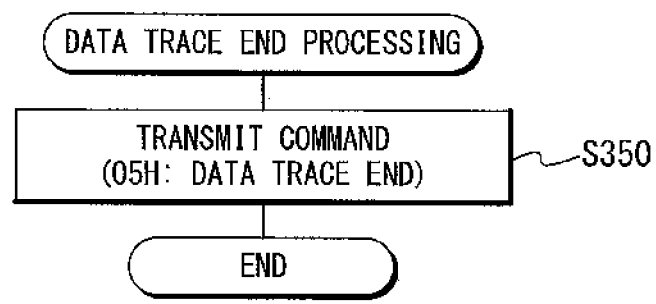
FIG. 21 is a flowchart showing an operation of the external tool 502 in end of data trace.

FIG. 21 shows the operation of the tool control section 512 in completing the data trace processing. At Step S350, the tool control section 512 issues CMD [0:2]=05H ("data trace end") as the control command, and the tool transmitting section 530 transmits the command to the microcontroller 102 by the debug communication input signal DI in synchronization with the debug clock signal DCLK. By issuing this command, the data trace processing at Step S301 to Step S319 is ended.

Figure 22A:
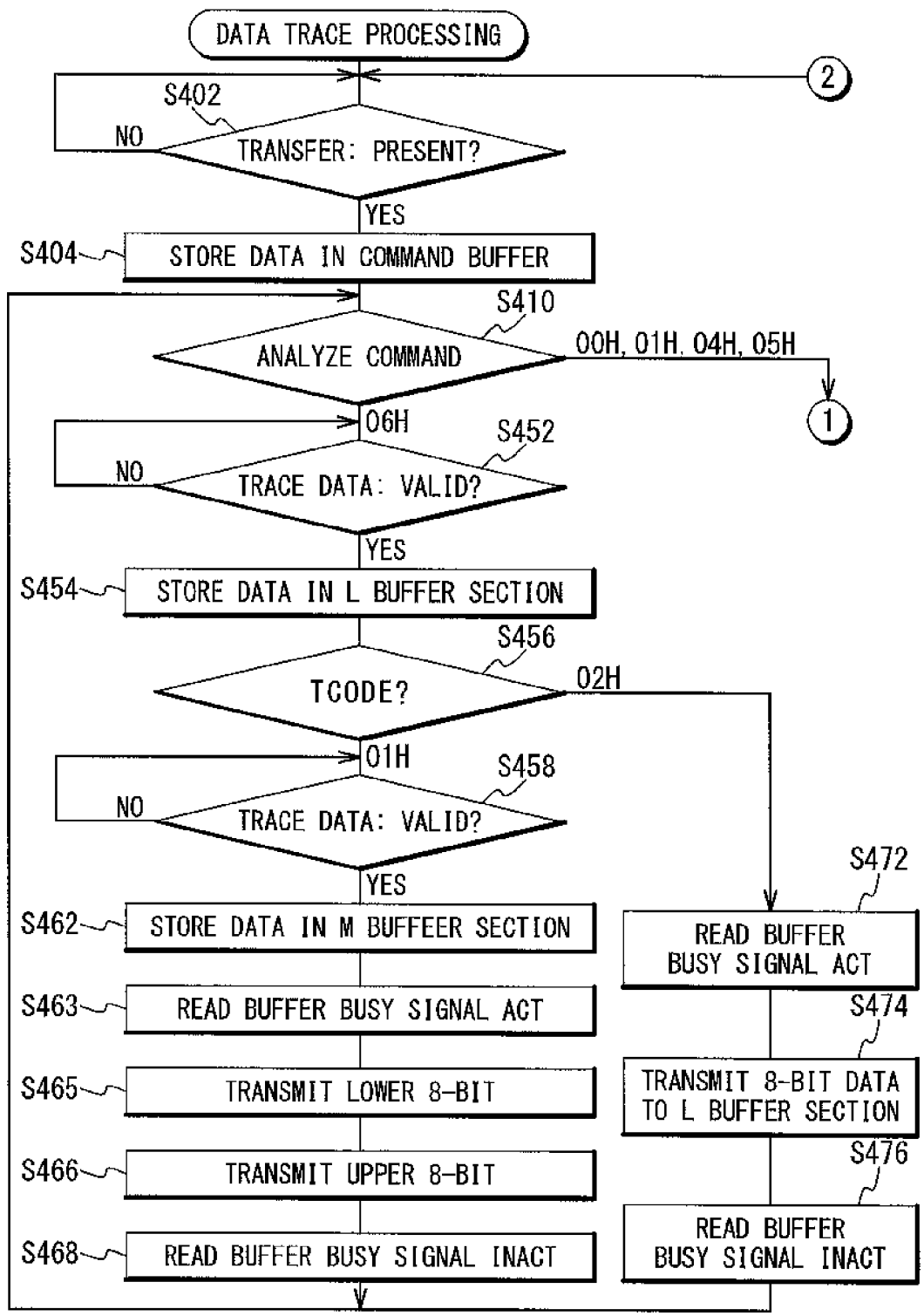

FIGS. 22A and 22B are flowcharts showing the operation of the microcontroller 102, that is, the operation of the transmitting and receiving section 302, mainly with respect to the transmitting section 402 and the sequence control section 312.

At Step S402 (FIG. 22A), to detect read command transfer or control command transfer, the reception data sampling section 322 monitors the debug communication input signal DI and waits until the STR bit is detected.

At Step S404, the reception data sampling section 322 samples the debug communication input/output signal DIO based on the debug clock signal DCLK and outputs the acquired 1-bit data to the reception shifter 330. The reception shifter 330 receives the data transmitted from the reception data sampling section 321 while shifting one by one bit. When completing the storage of the data of 11 bits, the reception shifter 330 outputs the 8-bit data portion by the reception data signal RCVD, activates the reception end signal RVED, and informs the end of reception to the sequence control section 312. The sequence control section 312 activates the command get signal CMGT and instructs the command buffer section 340 to receive a command. The command buffer section 340 receives the 8-bit data of the reception data signal RCVD and outputs the command data signal CD to the sequence control section 312.

At Step S410, the sequence control section 312 extracts 3 bits of the command (CMD [0:2]) from 8-bit data outputted by the command data signal CD from the command buffer section 340 and analyzes the command. The control flow proceeds to Step S412 (FIG. 22B) when the command (CMD [0:2]) is "00H", proceeds to Step S422 (FIG. 22B) when the command (CMD [0:2]) is "01H", proceeds to Step S432 (FIG. 22B) when the command (CMD [0:2]) is "04H", proceeds to Step S442 (FIG. 22B) when the command (CMD [0:2]) is "05H" and branches to Step S452 (FIG. 22A) when the command (CMD [0:2]) is "06H".

At Step S412 (FIG. 22B), the command (CMD [0:2]) represents "00H" (clock rate display register read) and the sequence control section 312 activates the command execution start signal CST and instructs the command executing section 360 to execute the command. The command execution start signal CST contains data indicating that the command "00H" is being processed (clock rate display register read). When the command execution start signal CST is set active, the command executing section 360 performs read access to the clock rate display register 120 through the command executing section read bus RB. The command executing section 360 outputs the read 8-bit data by the command executing section read data output signal CRDO, activates the command execution end signal CED, and informs the end of read to the sequence control section 312. Meanwhile, the transmitting section 405 stores the 8-bit data of the command executing section read data output signal CRDO outputted from the command executing section 360 in the internal read data buffer section 410, activates the read buffer section valid signal BVDB, and informs the end of preparation for transmission to the sequence control section 312.

At Step S414, the sequence control section 312 activates the transmission start signal SSTB, and instructs the transmitting section 405 to perform transmission. The transmitting section 405 stores 12-bit data including the 8-bit data stored in the read data buffer section 410, 1-bit data designated by the INFO information setting request signal SIQB (value is fixed to "0"), 1 STR bit, and 2 STP bits in the internal transmission shifter 420. The transmission shifter 420 shifts and outputs the data by the transmitting and receiving section output signal SRO one by one bit in synchronization with the debug clock signal DCLK. When completing the shift and output of 12 bits, the transmission shifter 420 activates the transmission end signal SEDB.

At Step S422, the command (CMD [0:2]) represents "01H" (clock rate change acknowledgement), and the sequence control section 312 activates the clock rate change acknowledge signal CACK, and informs to the system clock control section 240, that change of the clock rate is acknowledged. The system clock control section 240 in the CPU section 202 changes the rate of the system clock signal SCLK.

At Step S432, the command (CMD [0:2]) represents "04H" (data trace start), and the sequence control section 312 activates the command execution start signal CST, and instructs the command executing section 360 to start data trace. The command execution start signal CST contains data indicating that the command "04H" is being processed. The command executing section 360 operates an internal control bit in the data trace control section 270 through the command executing section write bus WB and instructs the start of data trace. At the same time, the command executing section 360 activates the command execution end signal CED, and informs to the sequence control section 312, that data trace is started.

At Step S442, the command (CMD [0:2]) represents "05H" (data trace end), and the sequence control section 312 activates the command execution start signal CST, and instructs the command executing section 360 to complete the data trace. The command execution start signal CST contains data indicating that the command "05H" is being processed. The command executing section 360 operates a control bit in the data trace control section 270 through the command executing section write bus WB, and instructs the end of data trace. At the same time, the command executing section 360 activates the command execution end signal CED, and informs to the sequence control section 312, that the data trance is completed.

At Step S452 (FIG. 22A), the command (CMD [0:2]) represents "06H" (trace data acquisition), and the transmission control section 430 waits until the 8-bit trace data, that is, the lower 8-bit trace data in the format A or trace data in the format B is transferred from the CPU section 202 by the trace output signal TRO. When the 8-bit trace data is transferred (YES in Step S452), the transmission control section 430 goes to a next operation (Step S454).

At Step S454, the transmission control section 430 stores the 8-bit trace data transferred by the trace output signal TRO in the M buffer section 412.

At Step S456, the transmission control section 430 examines TCODE of the transferred trace data. The control flow proceeds to Step S458 when TCODE is "01H" (CPU write), and branches to Step S472 when TCODE is "02H" (INFO active).

At Step S458, the transmission control section 430 waits until the next 8-bit trace data, that is, the upper 8-bit trace data in the format A is transferred by the trace output signal TRO.

At Step S462, the transmission control section 430 stores the transferred 8-bit trace data in the L buffer section 413.

At Step S463, the transmission control section 430 activates the read buffer section busy signal RBSY and informs to the CPU section 202, that the trace data to be outputted has been held. The transmission control section 430 activates the read buffer section valid signal BVDC, and informs to the transmitting and receiving section 302, that 16-bit trace data in the format A has been stored in the M buffer section 412 and the L buffer section 413. When the read buffer section busy signal RBSY is set active, even if the trace data is generated, the data trace control section 270 in the CPU section 202 holds the trace data and waits until the read buffer section busy signal RBSY is set inactive.

At Step S465, when the read buffer section valid signal BVDC(SYN) supplied through the synchronizing circuit 140 is set active, the sequence control section 312 activates the transmission start signal SSTC. When the transmission start signal SSTC(SYN) supplied through the synchronizing circuit 140 is set active, the transmission control section 430 activates a transmission start signal SFTS, and instructs the transmission shifter 420 to start transmission. The transmission shifter 420 shifts and outputs 12-bit data including 8-bit data of the M buffer section 412 outputted from the transmission control section 430, 1 STR bit, 1 bit of fixed value "0" and 2 STP bits by the transmitting section output signal SSO one by one bit in synchronization with the system clock signal SCLK. When completing the shift and output of 12 bits, the transmission shifter 420 activates a transmission end signal SFTE indicating end of transmission.

At Step S466, when the transmission end signal SFTE is set active, the transmission control section 430 activates the transmission start signal SFTS, and instructs the transmission shifter 420 to transmit the next data. The transmission shifter 420 shifts and outputs the 12-bit data including 8-bit data of the L buffer section 413 outputted from the transmission control section 430, 1 STR bit, 1 bit of fixed value "0" and 2 STP bits by the transmitting section output signal SSO one by one bit in synchronization with the system clock signal SCLK. When completing the shift and output of 12 bits, the transmission shifter 420 activates the transmission end signal SFTE, and informs the end of transmission to the transmission control section 430. The transmission control section 430 activates the transmission end signal SEDC, and informs the end of transmission of 16-bit trace data to the sequence control section 312.

At Step S468, the transmission control section 430 inactivates the read buffer section busy signal RBSY. The sequence control section 312 detects the data transmission end based on the fact that the transmission end signal SEDC(SYN) supplied through the synchronizing circuit 140 is set active, returns to command analysis (Step S410) and repeats the data transmission until the command is changed.

At Step S472, TCODE represents "02H" (INFO active), and the transmission control section 430 activates the read buffer section busy signal RBSY and the read buffer section valid signal BVDC. The read buffer section valid signal BVDC indicates that the 8-bit trace data in the format B has been stored in the M buffer section 412.

At Step S474, when the read buffer section valid signal BVDC(SYN) supplied through the synchronizing circuit 140 is set active, the sequence control section 312 activates the transmission start signal SSTC, and instructs the transmitting section 402 to start the transmission of the 8-bit data. When the transmission start signal SSTC(SYN) supplied through the synchronizing circuit 140 is set active, the transmission control section 430 activates the transmission start signal SFTS, and instructs the transmission shifter 420 to start the transmission. The transmission shifter 420 shifts and outputs the 12-bit data obtained by combining the 8-bit data in the M buffer section 412 outputted from the transmission control section 430, 1 STR bit, 1 bit of fixed value "0" and 2 STP bits by the transmitting section output signal SSO one by one bit in synchronization with the system clock signal SCLK. When completing the shift and output of 12 bits, the transmission shifter 420 activates the transmission end signal SFTE, and informs the end of transmission to the transmission control section 430. The transmission control section 430 activates the transmission end signal SEDC, and informs to the sequence control section 312, that transmission of the 8-bit data is completed.

At Step S476, the transmission control section 430 inactivates the read buffer section busy signal RBSY. The sequence control section 312 detects the data transmission end based on the fact that the transmission end signal SEDC(SYN) supplied through the synchronizing circuit 140 has been set active, returns to command analysis (Step S410) and repeats the data transmission until the command is changed.

In the present embodiment, the operational example is shown in which the data trace can be performed unlimitedly without performing read command transfer from the external tool 502. In other words, since data can be transmitted from the microcontroller 102 to the external tool 502 without performing the read command transfer from the external tool 502, the data trace function capable of monitoring the execution state of the data write access to the CPU 210 can be achieved as a part of communication between the microcontroller 102 and the external tool 502.

According to the present invention, since the system clock signal in the microcontroller is used as the debug communication clock, there is a case that communication for debugging is not correctly performed even if the rate of the system clock is changed irrespective of the debug communication state (including stop). Therefore, the debug operation based on communication for debugging can be continued without depending on the rate of the system clock. Further, the high-speed clock in the microcontroller can be used as the clock for communication for debugging, thereby facilitating the increase in the communication rate and improving performances of the debugging function.

In the above description, a debugging apparatus has a configuration equivalent to that of the microcontroller other than the CPU section.

Although the present invention has been described referring to the embodiments, the present invention is not limited to the embodiments described above and may be combined and implemented so as not to cause any contradiction. It could be understood that those skilled in the art can perform various modifications of the present invention within the scope of the present invention.

What is claimed is:

1. A microcontroller comprising:
    a CPU section configured to execute a program as a debugging target in response to a first clock signal having a clock rate that is variable, wherein the clock rate of said first clock signal is changed in response to an instruction from said CPU section;
    a first transmitting section configured to output debugging data in response to said first clock signal;
    a second transmitting section configured to output the debugging data in response to a second clock signal, which is different from said first clock signal and has a clock rate that is fixed.

2. The microcontroller according to claim 1, further comprising:
    a sequence control section configured to select a transmitting section from among said first transmitting section and said second transmitting section in response to a command and to transmit the debugging data by using the selected transmitting section.

3. The microcontroller according to claim 2, wherein said CPU section comprises:
    a CPU configured to execute the program in response to said first clock signal; and
    a clock control section configured to receive, as the instruction from the CPU, a clock rate change request for the clock rate of said first clock signal, notify said sequence control section of the clock rate change request, and change the clock rate of said first clock signal in response to receiving a permission signal from the sequence control section, and
    wherein said sequence control section outputs the permission signal to said clock control section.

4. The microcontroller according to claim 1, wherein said first clock signal is a system clock signal supplied to said CPU section, and said second clock signal is a debug clock signal with a fixed clock rate used for debugging.

* * * * *